(12) United States Patent
Sekimoto et al.

(10) Patent No.: US 9,568,705 B2
(45) Date of Patent: Feb. 14, 2017

(54) CAMERA MODULE MANUFACTURING METHOD, CAMERA MODULE, AND ELECTRONIC APPARATUS

(75) Inventors: Yoshihiro Sekimoto, Osaka (JP); Kazuya Fujita, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 116 days.

(21) Appl. No.: 13/983,876

(22) PCT Filed: Jan. 20, 2012

(86) PCT No.: PCT/JP2012/051166
§ 371 (c)(1),
(2), (4) Date: Aug. 6, 2013

(87) PCT Pub. No.: WO2012/108247
PCT Pub. Date: Aug. 16, 2012

(65) Prior Publication Data
US 2013/0314810 A1    Nov. 28, 2013

(30) Foreign Application Priority Data

Feb. 10, 2011    (JP) ................................ 2011-027875
May 13, 2011     (JP) ................................ 2011-108788
Nov. 24, 2011    (JP) ................................ 2011-256694

(51) Int. Cl.
G02B 7/02    (2006.01)
G02B 7/09    (2006.01)
(Continued)

(52) U.S. Cl.
CPC ................. G02B 7/09 (2013.01); G02B 7/021 (2013.01); G02B 7/023 (2013.01); G02B 7/08 (2013.01);
(Continued)

(58) Field of Classification Search
USPC ............... 359/811, 813, 815, 819–824, 800, 803, 359/808, 810, 826
See application file for complete search history.

(56) References Cited

U.S. PATENT DOCUMENTS

2007/0069105 A1*  3/2007  Lin ........................... 250/201.2
2009/0278978 A1   11/2009  Suzuki
(Continued)

FOREIGN PATENT DOCUMENTS

JP    60-133568 S    7/1985
JP    10-256412 H    9/1998
(Continued)

*Primary Examiner* — Joseph P Martinez
*Assistant Examiner* — Brandi Thomas
(74) *Attorney, Agent, or Firm* — Keating & Bennett, LLP

(57) ABSTRACT

A camera module (40) of the present invention includes: an optical section (1) having an image pickup lens (2) and a lens barrel (3); and a lens driving device (10) including a lens holder (11). The optical section (1) and the lens driving device (10) are provided on an upper side of a sensor cover (23) covering an image pickup element (22) of an image pickup section (20). The lens barrel (3) is positioned at such a location that the lens barrel (3) does not make contact with the sensor cover (23), so that the lens barrel (3) is fixed to the lens holder (11) at the location. Before being fixed to the lens holder (11), the lens barrel (3) is slidable in the optical axis direction with respect to the lens holder (11).

11 Claims, 25 Drawing Sheets

(51) Int. Cl.
*G03B 3/10* (2006.01)
*H04N 5/225* (2006.01)
*G02B 7/08* (2006.01)

(52) U.S. Cl.
CPC .............. *G03B 3/10* (2013.01); *H04N 5/2257* (2013.01); *G03B 2205/0007* (2013.01); *G03B 2205/0069* (2013.01); *Y10T 29/4978* (2015.01)

(56) References Cited

U.S. PATENT DOCUMENTS

| | | | |
|---|---|---|---|
| 2010/0110270 A1* | 5/2010 | Sekimoto et al. | 348/340 |
| 2011/0096178 A1 | 4/2011 | Ryu et al. | |
| 2011/0097062 A1 | 4/2011 | Tsuruta et al. | |
| 2011/0103782 A1 | 5/2011 | Tsuruta et al. | |

FOREIGN PATENT DOCUMENTS

| | | |
|---|---|---|
| JP | 2008-175946 A | 7/2008 |
| JP | 2009-271405 A | 11/2009 |
| JP | 2009-288770 A | 12/2009 |
| JP | 2010-134409 A | 6/2010 |
| JP | 2010-230910 A | 10/2010 |
| WO | 2009/139543 A1 | 11/2009 |

* cited by examiner

F I G. 19
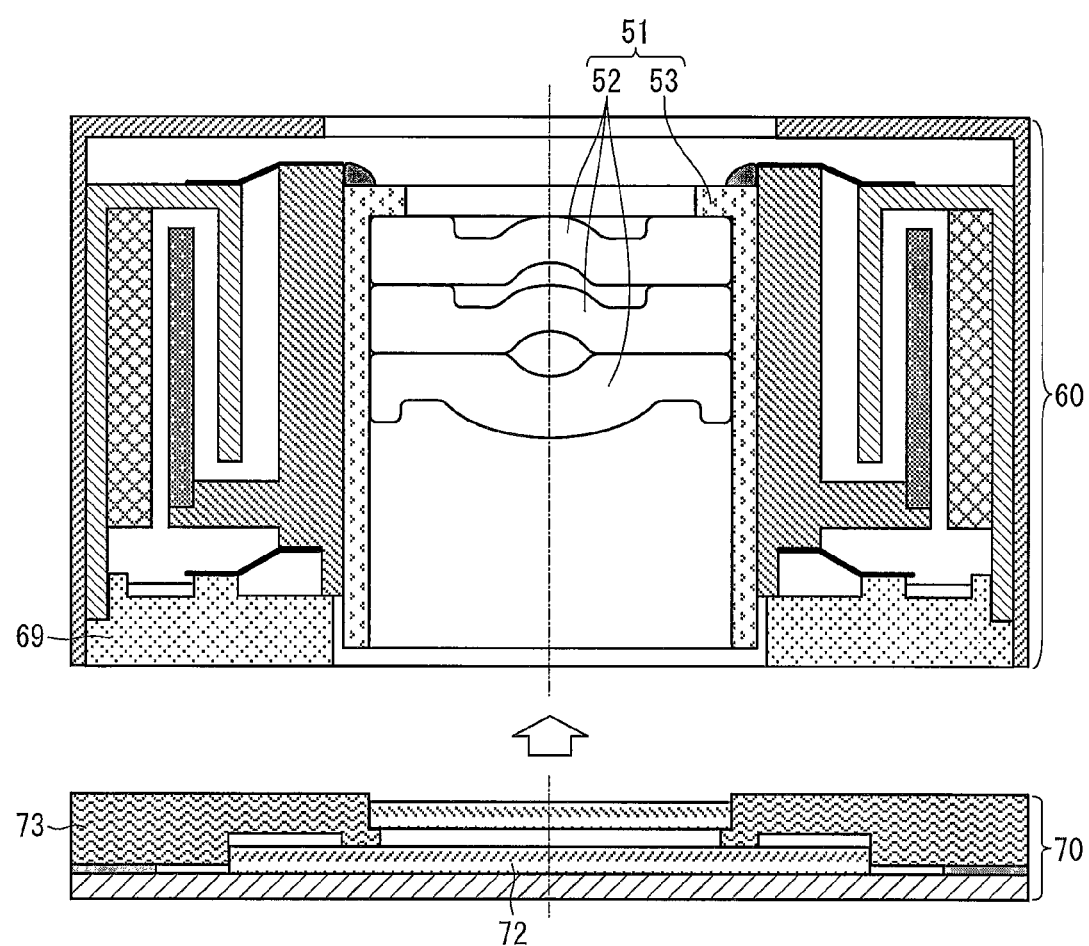

F I G. 2 0
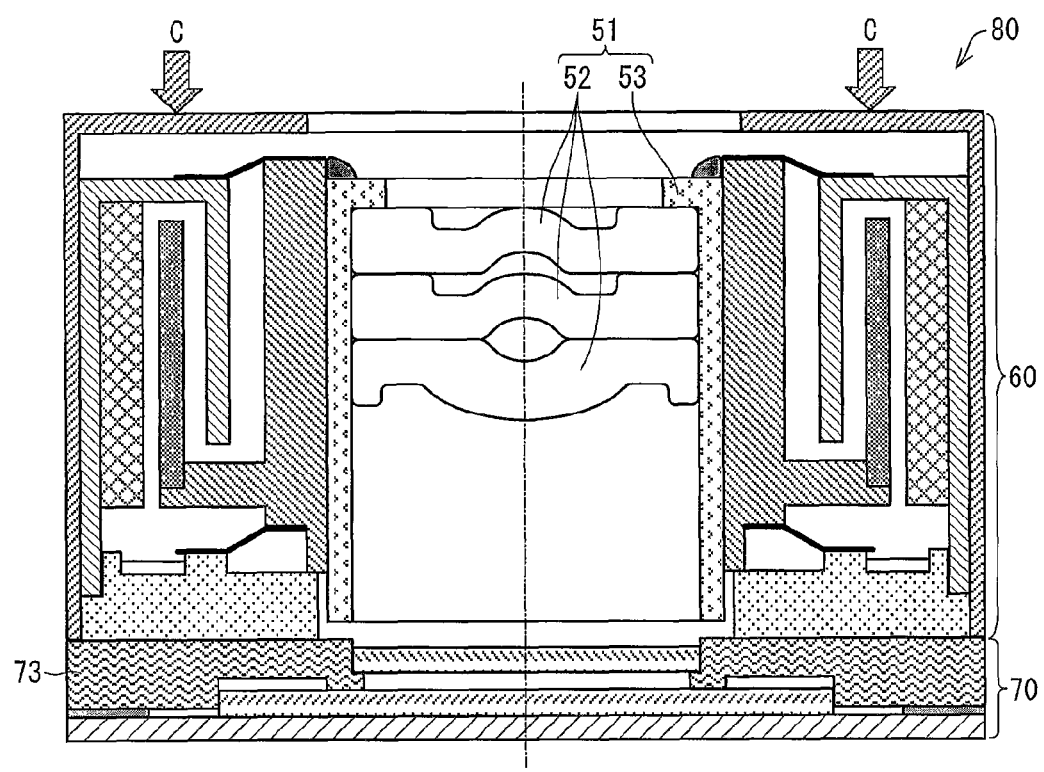

F I G. 2 2
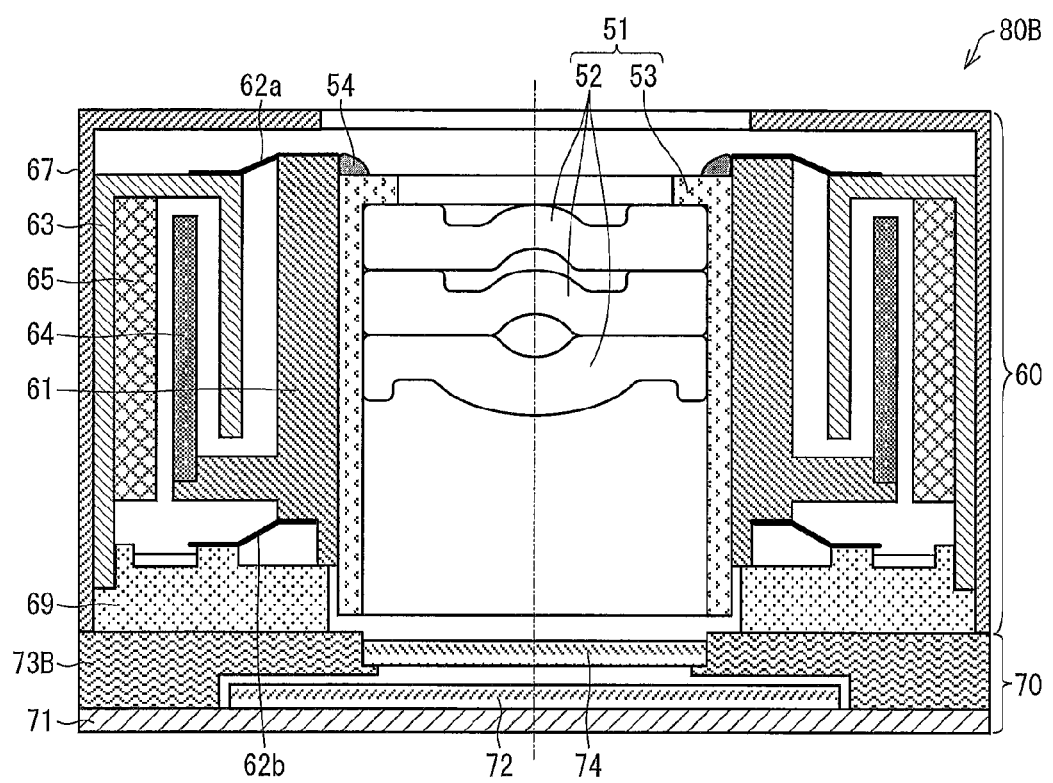

CAMERA MODULE MANUFACTURING METHOD, CAMERA MODULE, AND ELECTRONIC APPARATUS

CROSS-REFERENCE TO RELATED APPLICATIONS

This application is the U.S. national phase, pursuant to 35 U.S.C. §371, of PCT international application Ser. No. PCT/JP2012/05116, filed Jan. 20, 2012, designating the United States and published in Japanese on Aug. 16, 2012 as publication WO 2012/108247 A1, which claims priority to Japanese patent application No. 2011-027875, filed Feb. 10, 2011, Japanese patent application No. 2011-108788, filed May 13, 2011, and Japanese patent application No. 2011-256694, filed Nov. 24, 2011. The entire contents of the aforementioned applications are incorporated herein by reference in their entirety.

TECHNICAL FIELD

The present invention relates to: a method for producing a camera module which is incorporated in an electronic apparatus such as a mobile phone and which has an auto-focus function and/or an image stabilization function; the camera module; and the electronic apparatus. The present invention particularly relates to a technique for preventing a camera module not performing focus adjustment with use of a screw from hysteresis at a starting position, and a technique for preventing such a camera module from causing sliding between a lens barrel of an optical section and a sensor cover of an image pickup section at a height of an initial position of the optical section.

BACKGROUND ART

On the recent mobile phone market, types of mobile phones having built-in camera modules have been dominant. These camera modules are meant to be embedded in the mobile phones. Therefore, they face greater demands for being compact and lightweight, compared with camera modules to be embedded in digital cameras.

Among such camera modules, there have been an increasing number of camera modules that (i) operate their auto-focus (AF) systems with the use of lens drive devices and (ii) are mounted on electronic devices such as mobile phones. Examples of lens drive devices that have been developed so far encompass those employing stepper motors, piezoelectric elements, and VCM (Voice Coil Motor). Such lens drive devices have already been distributed on the market.

Meanwhile, now that such camera modules having auto-focus (AF) systems have become new standards, a system for image stabilization is becoming the focus of attention as a next distinctive feature. Although a system for image stabilization has been widely used for digital cameras and camcorders, there have been only a few mobile phones equipped with systems for image stabilization, due to the issue of a limited size of mobile phone. Nevertheless, it is expected that mobile-phone-specified camera modules having systems for image stabilization will be more widespread in years to come, and, in fact, a new system (configuration) for image stabilization, which can be made compact, has been suggested.

A camera module capable of image stabilization and intended to be incorporated into a mobile phone is disclosed in Patent Literature 1, for example. The technique disclosed in Patent Literature 1 relates to an Optical Image Stabilizer (OIS).

The optical image stabilizer disclosed in Patent Literature 1 has a structure in which a conventional AF camera module called an imaging unit (movable module) is supported by four suspension wires at four corners of the imaging unit, and the imaging unit is driven in directions of two axes each orthogonal to an optical axis, thereby stabilizing an image. A mechanism for driving the imaging unit is such that magnets are provided on four circumferential side surfaces of a cover section on which the imaging unit is mounted, and coils are provided at yokes of a fixed part so as to face the magnets. This mechanism enables the imaging unit (movable module) to stabilize an image independently in the two axes orthogonal to the optical axis. According to Patent Literature 1, the optical image stabilizer disclosed therein is designed such that the imaging unit as a whole is driven in directions orthogonal to the optical axis. A generally employed arrangement for image stabilization is such that relative displacement is provided between an image pickup lens and an image pickup element.

In a case of an AF camera module involving fixing of the lenses to the lens driving device, it is necessary to appropriately set an initial position of the lenses in an optical axis direction with respect to an image pickup element. Otherwise, a defocused image is caused.

In view of this, among the conventional AF camera modules, dominating AF camera modules have a mechanism in which a screw structure is provided in a lens barrel (housing in which a plurality of lenses are built) and a lens holder so that the position of the lenses in an optical axis direction is adjusted.

On the other hand, in a case of a fixed-focus camera module which does not require movement of lenses in carrying out the setting for an initial position of the lenses, it is possible to set the initial position of the lens with high precision by directly attaching the lens or a lens holder holding the lenses to an image pickup element or a member holding the image pickup element.

For example, Patent Literature 2 discloses an AF camera module which does not have a screw structure and in which focus adjustment for the setting of an initial position during the production of the AF camera module is not performed with a screw.

FIG. 23 shows a cross sectional view of a representative example of the AF camera module disclosed in Patent Literature 2.

As shown in FIG. 23, an AF camera module 100 disclosed in Patent Literature 2 includes an optical section 101 serving as an image pickup optical system, a lens driving device 102 which drives the optical section 101, and an image pickup section 103 which carries out photoelectric conversion of light having passed through the optical section 101. The image pickup section 103 includes a sensor section 104 and a substrate 105 on which the sensor section 104 is mounted. The sensor section 104 includes a glass substrate 120, a sensor chip 121, and a sensor cover 122.

The optical section 101 includes a plurality of image pickup lenses 106 and a lens barrel 107 which holds the image pickup lenses 106. The lens barrel 107 is fixed to a lens holder 108 in the lens driving device 102. The lens holder 108 is supported by two (upper and lower) springs 109a and 109b so as to be movable in an optical axis direction with respect to a fixed section. Coils 110 are fixed on the periphery of the lens holder 108. The fixed section includes a yoke 111, a permanent magnet 112, a cover 114, a base 115 etc. The lens driving device 102 is mounted on a sensor cover 122.

The lens barrel 107 and the lens holder 108 are not threaded. Accordingly, the lens barrel 107 is so positioned as to abut the upper surface of the sensor cover 122 while the lens holder 108 is located at a mechanical end on an infinite-distance side, and the lens barrel 107 is adhesively fixed to the lens holder 108 with an adhesive 124.

This configuration enables the height of the image pickup lenses 106 with respect to the sensor chip 121 to have only minor tolerances, such as a tolerance for the thickness of the sensor cover 122 and a tolerance for the position where the image pickup lenses 106 are attached in the lens barrel 107. Consequently, it is possible to determine the initial position of the image pickup lenses 106 with high precision without adjusting the height of the lenses with use of a screw, and so it is possible to omit a focus adjustment process for determining the initial position.

CITATION LIST

Patent Literatures

[Patent Literature 1]
Japanese Patent Application Publication No. 2009-288770 (published on Dec. 10, 2009)
[Patent Literature 2]
Japanese Patent Application Publication No. 2010-134409 (published on Jun. 17, 2010)

SUMMARY OF INVENTION

Technical Problem

However, the conventional camera modules disclosed in Patent Literatures 1 and 2 have problems below.

Initially, the following description will discuss a problem caused by the image-stabilizer-equipped camera module as disclosed in Patent Literature 1 performing the focus adjustment for the initial position setting by screwing the lens barrel into the lens holder, as in a conventional AF camera module.

In the image-stabilizer-equipped camera module as disclosed in Patent Literature 1, a movable section including the lenses is supported in such a manner as to be movable in directions orthogonal to an optical axis. Accordingly, in order to avoid friction between the movable section including a lens and a fixed section when the movable section is driven, some gap along the optical axis needs to be provided between the movable section and the fixed section. The lens barrel needs to be screwed into the lens holder by application of a force to some extent also in the optical axis direction as well, and the force applied in the optical axis direction may break a spring (four suspension wires in the example of Patent Literature 1) supporting the movable section. Even if the spring is not broken, applying the force to screw against the spring force may return the spring to its original position when the applied force is removed, resulting in misplacement of the position of the lens having been adjusted. In order to avoid such a problem, it is necessary to employ an adjustment method which eliminates the need for application of a force in the optical axis direction or a structure which does not require the adjustment itself.

Next, the following description will discuss giving an image stabilization function to an AF camera module which does not require adjustment of an initial position of a lens, as disclosed in Patent Literature 2. In this case, since the lens barrel 107 is so positioned to abut the upper surface of the sensor cover 122, the lens barrel 107 slides over the sensor cover 122 when the optical section 101 is moved in a direction orthogonal to the optical axis during the image stabilization.

This gives rise to the risk of scraping of a reference plane which is a plane where the lens barrel 107 abuts the sensor cover 122 and the risk of generating foreign matters.

In the AF camera module which does not require adjusting the initial position of the lens, as disclosed in Patent Literature 2, a lower reference plane of the lens holder 108 abuts an upper reference plane of the base 115 at a mechanical end on an infinite-distance side. At the same time, a lower reference plane of the lens barrel 107 abuts an upper reference plane of the sensor cover 122.

On the other hand, in a general lens driving device, when adhesive foreign matters exist on a contacting plane of reference planes at a mechanical end on an infinite-distance side, stroke characteristics in an advance direction (upward direction on the sheet of FIG. 23) differ from stroke characteristics in a retraction direction (downward direction on the sheet of FIG. 23), as shown in FIGS. 23 and 24. As a result, hysteresis may occur at and near the starting position of lenses (position where a lens starts to move from stroke 0). This is because when lenses are displaced in the advance direction, existence of adhesive matters exert a restituting force against a force to advance the lens holder 108 and the lens barrel 107, and at a moment when a force larger than this resistance is exerted to separate the reference planes from each other, the resistance disappears, resulting in sudden displacement of the lens to a position proportional to a spring force. In contrast, in the case of displacement in the retraction direction, such resistance is not exerted until the reference planes come into contact with each other, so that stroke characteristics in which a current is substantially proportional to a stroke are exhibited.

Hysteresis occurs at and around the starting position due to the above principle. Such hysteresis at and around the starting position is not preferable because it prevents minute position control at an infinite-distance side.

Examples of the adhesive foreign matters include a case where an adhesive for fixing the lens barrel 107 is fixed while being not cured, a case where a solder flux in a cleaning solution is deposited, and a case where a releasing agent for a resin member is fixed.

As the area where the reference planes contact each other is larger, the possibility that adhesive foreign matters adhere is higher. Besides, as the area is larger, resistance caused when the adhesive foreign matters adhere is larger. Accordingly, it is desirable that the area where the reference planes contact each other is smaller. However, if one area where the reference planes contact each other is too small, there is a possibility that the contact planes are crushed or broken due to a drop impact or the like. Accordingly, the area cannot be made small indefinitely. It is also important to reduce the number of the area where the reference planes contact each other.

As described above, in the configuration disclosed in Patent Literature 2, at the end of the mechanism which is closer to a point at infinity, the lower reference plane of the lens holder 108 abuts the upper reference plane of the base 115, and the lower reference plane of the lens barrel 107 abuts the upper reference plane of the sensor cover 122. This results in increased number of the area where the reference planes contact each other, resulting in larger area where the reference planes contact each other. This problematically creates an environment where hysteresis is likely to occur at and around the starting position.

The present invention was made in view of the foregoing problems. An object of the present invention is to provide a method for producing a camera module capable of preventing sliding between a lens barrel which holds an image pickup lens and a sensor cover of an image pickup section and thus preventing generation of foreign matters due to the sliding, even in a case where the height of an initial position of the image pickup lens is not adjusted by using a screw; the camera module; and an electronic apparatus including the camera module.

Solution to Problem

In order to solve the foregoing problems, a camera module of the present invention is a camera module, comprising: an optical section having an image pickup lens and a lens barrel holding the image pickup lens; and a lens driving device which includes a lens holder holding the optical section and which drives the optical section and the lens holder integrally with each other in at least an optical axis direction, the optical section and the lens driving device being provided on an upper side of a sensor cover covering an image pickup element of an image pickup section, the lens barrel being positioned at such a location that the lens barrel does not make contact with the sensor cover, so that the lens barrel is fixed to the lens holder at the location, and before being fixed to the lens holder, the lens barrel being slidable in the optical axis direction with respect to the lens holder.

With the invention, the lens barrel is caused to slide in the optical axis direction with respect to the lens holder in order to be positioned at such a location that the lens barrel does not make contact with the sensor cover, and thereafter the lens barrel is fixed to the lens holder.

Consequently, it is unnecessary to adjust a height of an initial position of the image pickup lens with use of a screw, it is possible to simplify or omit a step of adjusting a focus at the initial position, and it is possible to prevent sliding between the lens barrel and the sensor cover, thereby preventing generation of foreign matters etc. due to the sliding. Furthermore, since it is unnecessary to adjust the height of the initial position of the image pickup lens with use of a screw, this configuration is applicable to a small camera module.

Therefore, it is possible to provide a small camera module capable of preventing sliding between the lens barrel, which holds the image pickup lens, and the sensor cover of the image pickup section and thus preventing generation of foreign matters due to the sliding, even in a case where the height of the initial position of the image pickup lens is not adjusted with use of a screw.

Furthermore, it is possible to reduce the cost etc. for molds for causing the lens barrel and the lens holder to have threaded parts used for the focus adjustment at the initial position, and the need for a step of carrying out screwing for the focus adjustment at the initial position is eliminated. In consideration of this, at least one of the lens barrel and the lens holder may be provided with a screw such as screw-thread cutting for adhesive collection.

A method of the present invention for producing a camera module is a method for producing a camera module including: an optical section having an image pickup lens and a lens barrel holding the image pickup lens; and a lens driving device which includes a lens holder holding the optical section and which drives the optical section and the lens holder integrally with each other in at least an optical axis direction, the optical section and the lens driving device being provided on an upper side of a sensor cover covering an image pickup element of an image pickup section, the method comprising the steps of: sliding the lens barrel of the optical section in the optical axis direction with respect to the lens holder of the lens driving device; and carrying out positioning of the optical section with use of a jig by determining a height of an initial position of the optical section so that the lens barrel is located at such a position that the lens barrel does not make contact with the sensor cover, and then fixing the optical section to the lens driving device.

Consequently, a vertical position of the image pickup lens is determined by using a jig. This eliminates the need for the step of carrying out screwing for the focus adjustment at the initial position, and makes it possible to simplify the focus adjustment at the initial position.

Therefore, it is possible to provide (i) a small camera module capable of preventing sliding between the lens barrel, which holds the image pickup lens, and the sensor cover of the image pickup section and thus preventing generation of foreign matters due to the sliding, even in a case where the height of the initial position of the image pickup lens is not adjusted with use of a screw, and (ii) a method for producing the camera module.

In order to solve the foregoing problems, an electronic apparatus of the present invention includes the aforementioned camera module.

According to the invention described above, it is possible to provide an electronic apparatus including a small camera module capable of preventing sliding between the lens barrel, which holds the image pickup lens, and the sensor cover of the image pickup section, and thus preventing generation of foreign matters due to the sliding, even in a case where the height of the initial position of the image pickup lens is not adjusted with use of a screw.

Advantageous Effects of Invention

As described above, the method of the present invention comprises the steps of: sliding the lens barrel of the optical section in the optical axis direction with respect to the lens holder of the lens driving device; and carrying out positioning of the optical section with use of a jig by determining a height of an initial position of the optical section so that the lens barrel is located at such a position that the lens barrel does not make contact with the sensor cover, and then fixing the optical section to the lens driving device.

As described above, the camera module of the present invention is arranged such that the lens barrel is positioned at such a location that the lens barrel does not make contact with the sensor cover, so that the lens barrel is fixed to the lens holder at the location, and before being fixed to the lens holder, the lens barrel is slidable in the optical axis direction with respect to the lens holder.

As described above, the electronic apparatus of the present invention includes the aforementioned camera module.

Therefore, it is possible to provide: a method for producing a camera module capable of preventing sliding between the lens barrel, which holds the image pickup lens, and the sensor cover of the image pickup section, and thus preventing generation of foreign matters due to the sliding, even in a case where the height of the initial position of the image pickup lens is not adjusted with use of a screw; the camera module; and an electronic apparatus including the camera module.

Figure 10:
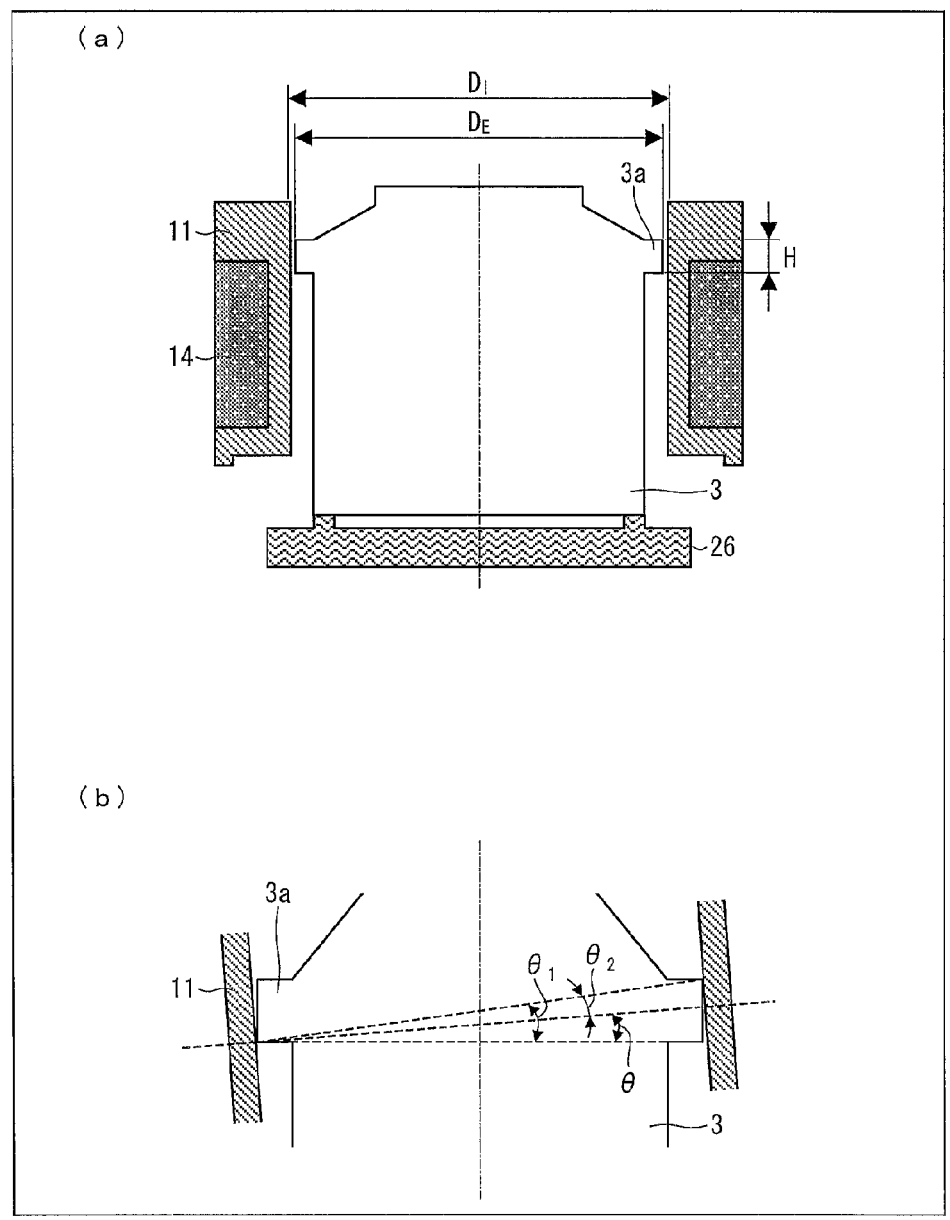

(a) and (b) of FIG. 10 are cross sectional views of main parts, for explaining the influence of inclination of a lens holder on the camera module.

Figure 11:
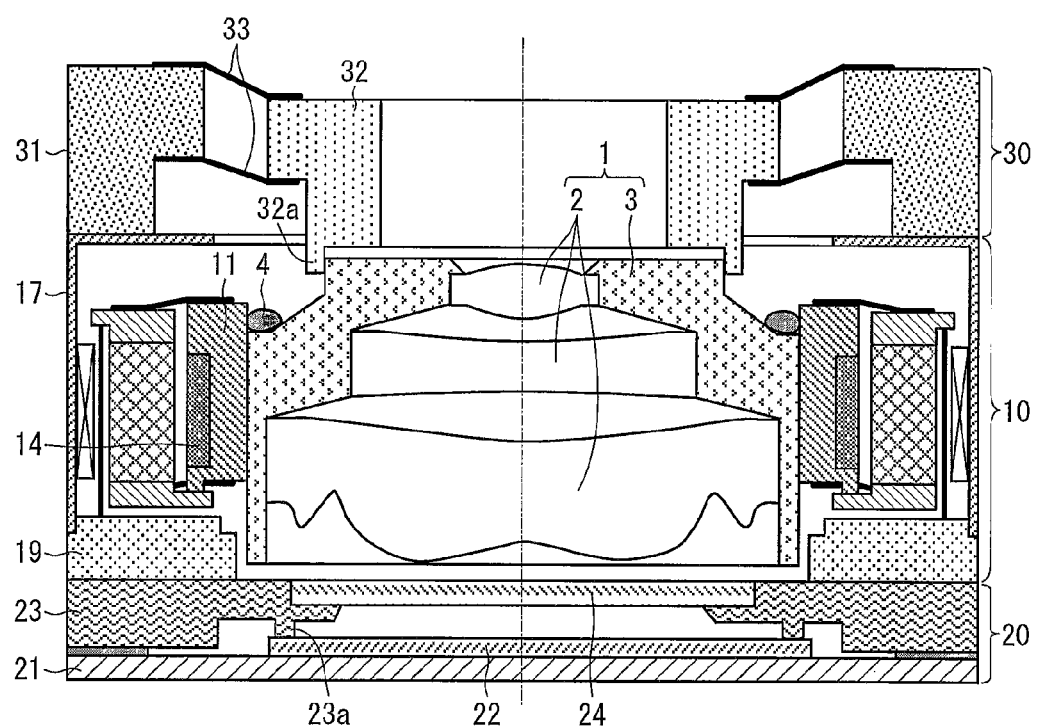

FIG. 11 is a cross sectional view showing another production step for the camera module.

Figure 12:
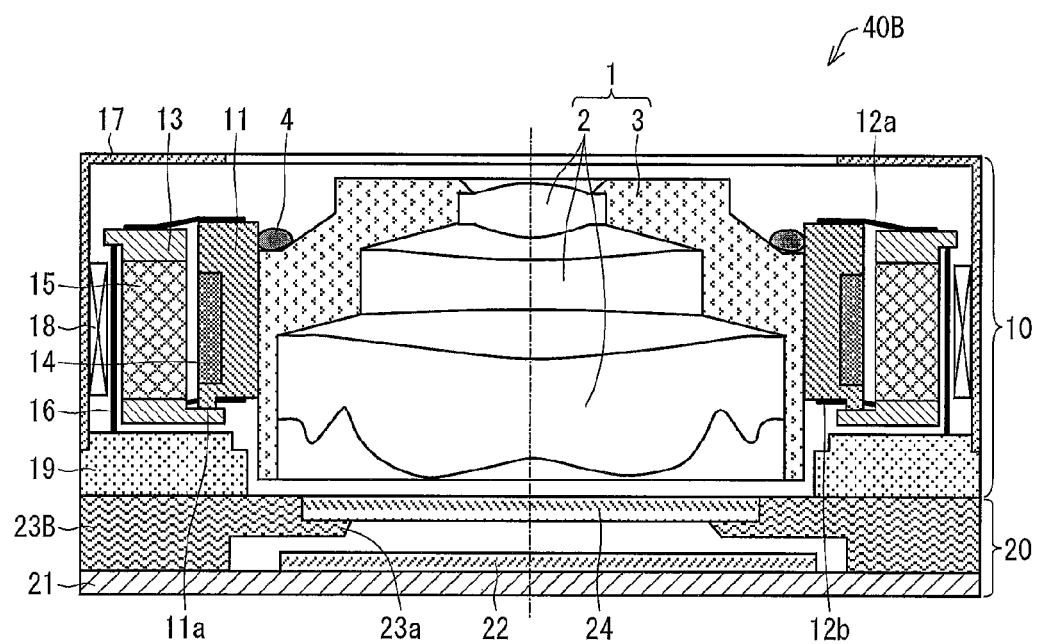

FIG. 12 is a cross sectional view showing a still another embodiment of the camera module of the present invention, showing a configuration of a camera module having an image stabilization function.

Figure 13:
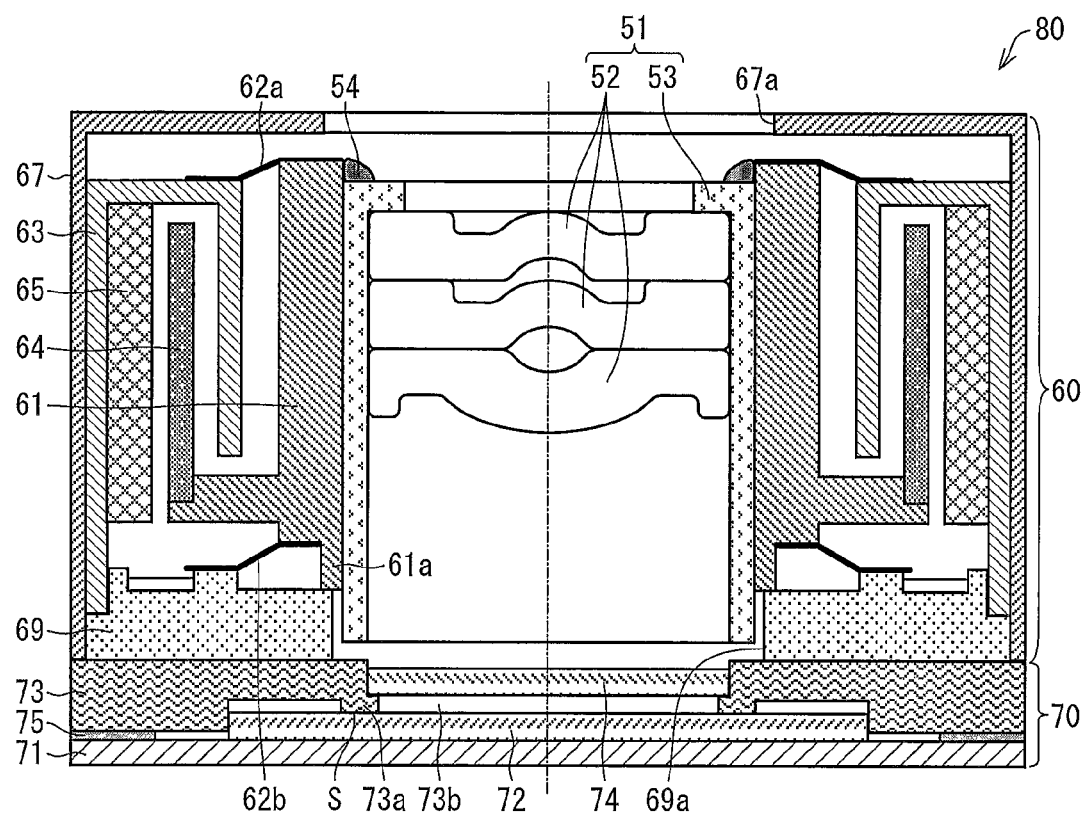
Figure 14:
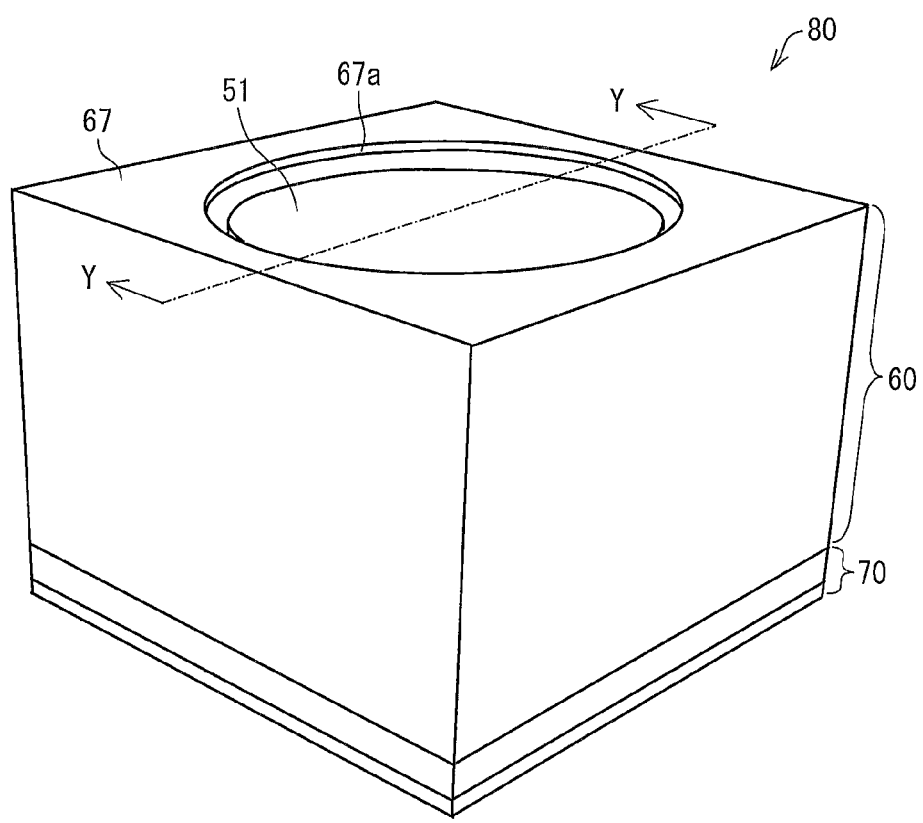

FIG. 13 is a cross sectional view showing still another embodiment of the camera module of the present invention, showing a configuration of a camera module having an AF function, taken along an arrow line Y-Y of the camera module shown in FIG. 14.

FIG. 14 is a perspective view showing a whole configuration of the camera module having an AF function.

Figure 15:
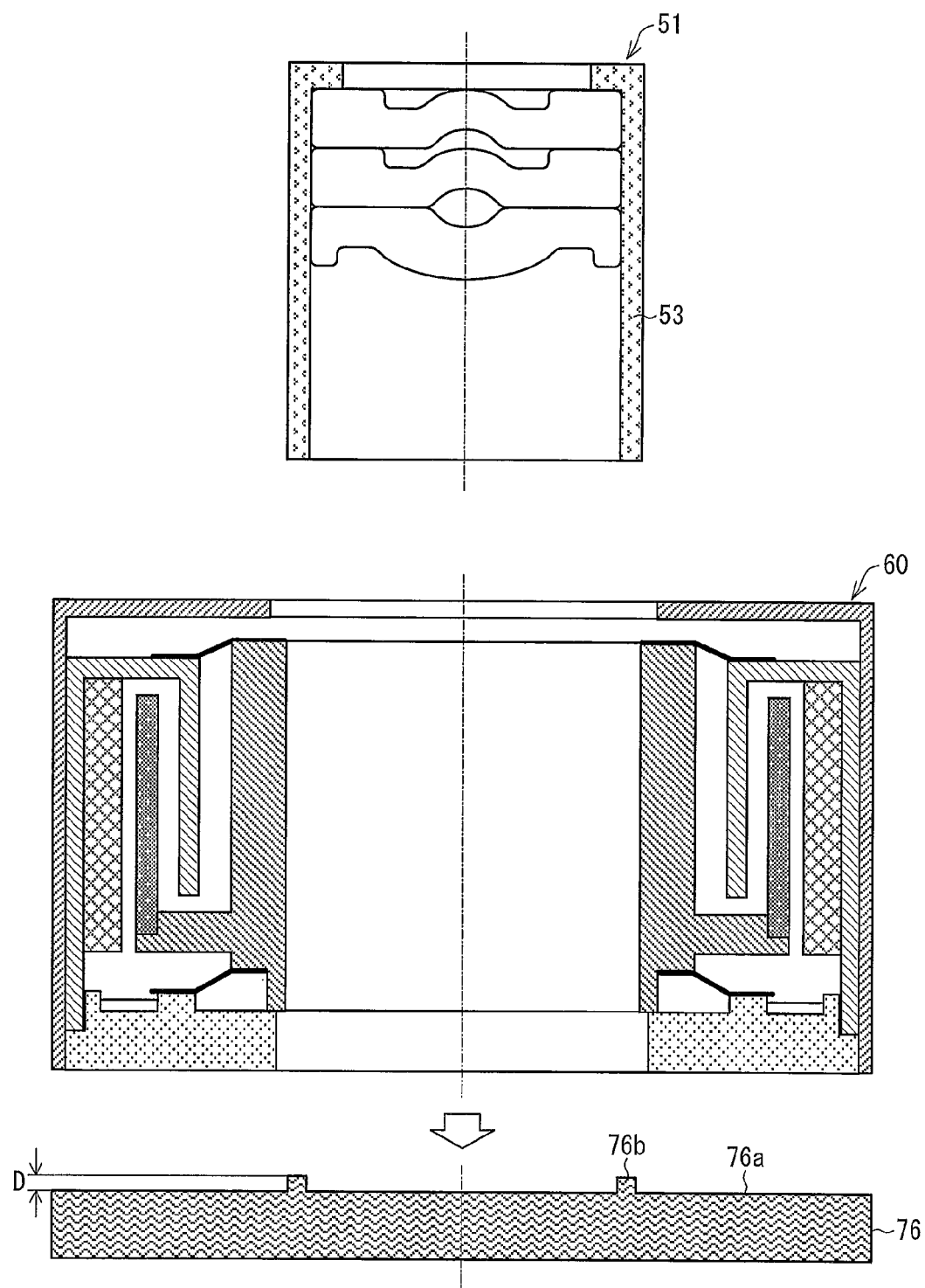

FIG. 15 is a cross sectional view showing a production step for the camera module, showing a step of preparing a dummy sensor cover serving as a jig.

Figure 16:
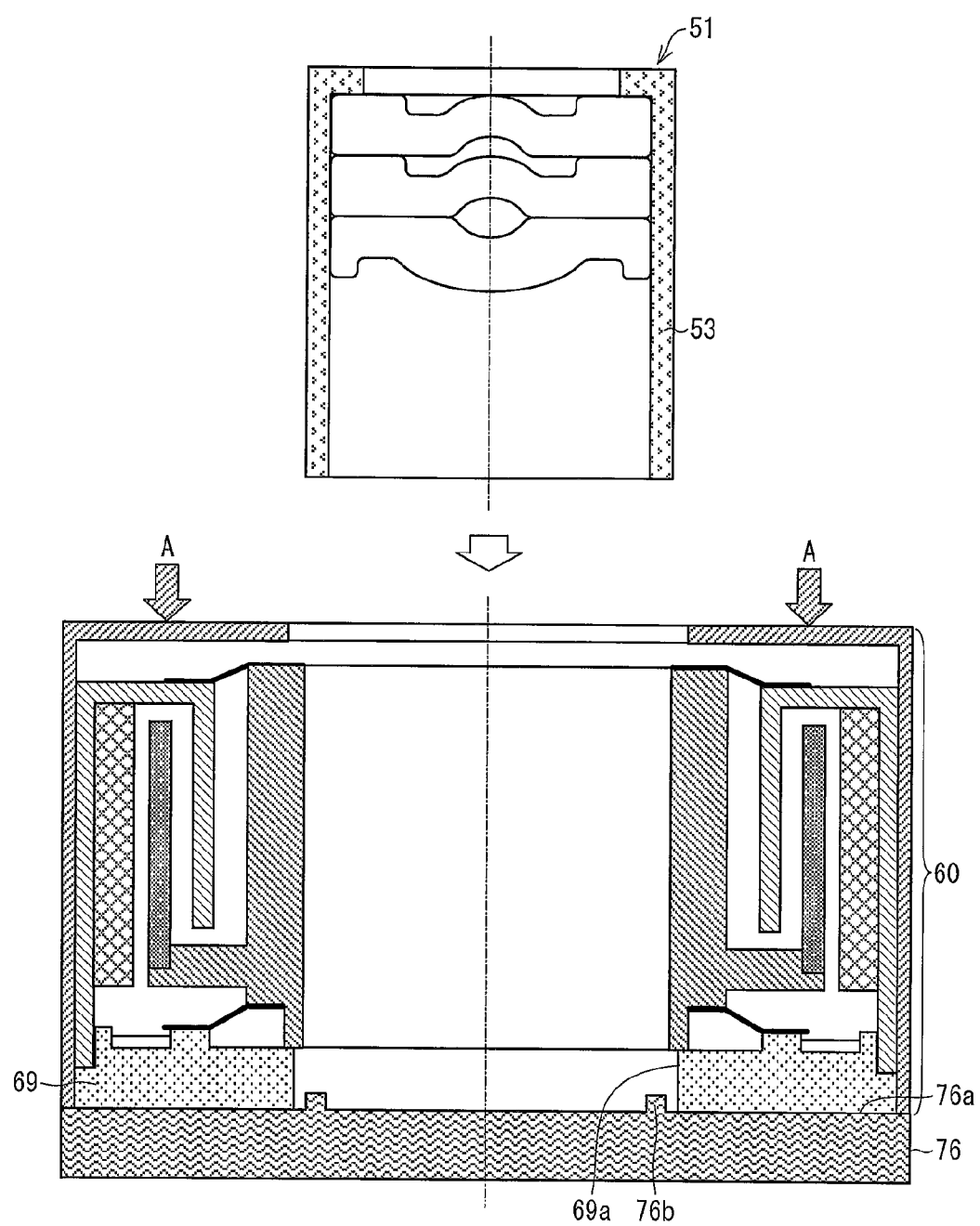

FIG. 16 is a cross sectional view showing a production step for the camera module, showing a state where a lens driving device is mounted on the dummy sensor cover.

Figure 17:
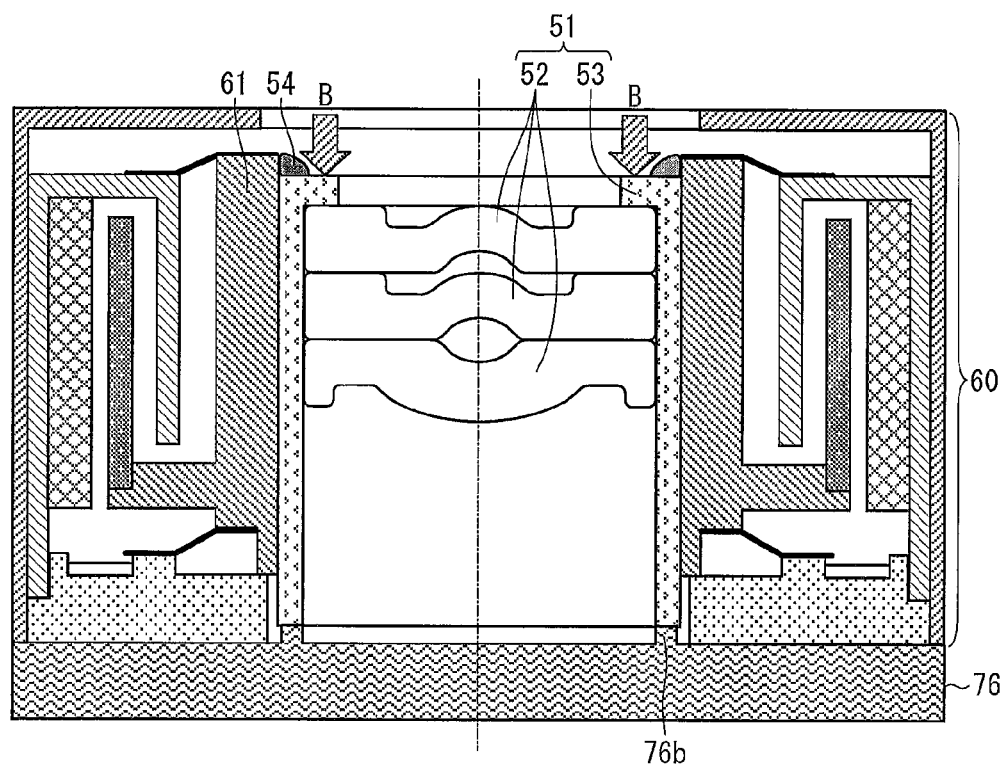

FIG. 17 is a cross sectional view showing a production step for the camera module, showing a state where a lens barrel is mounted on the lens driving device in such a manner that the lens barrel touches a protrusion of the dummy sensor cover.

Figure 18:
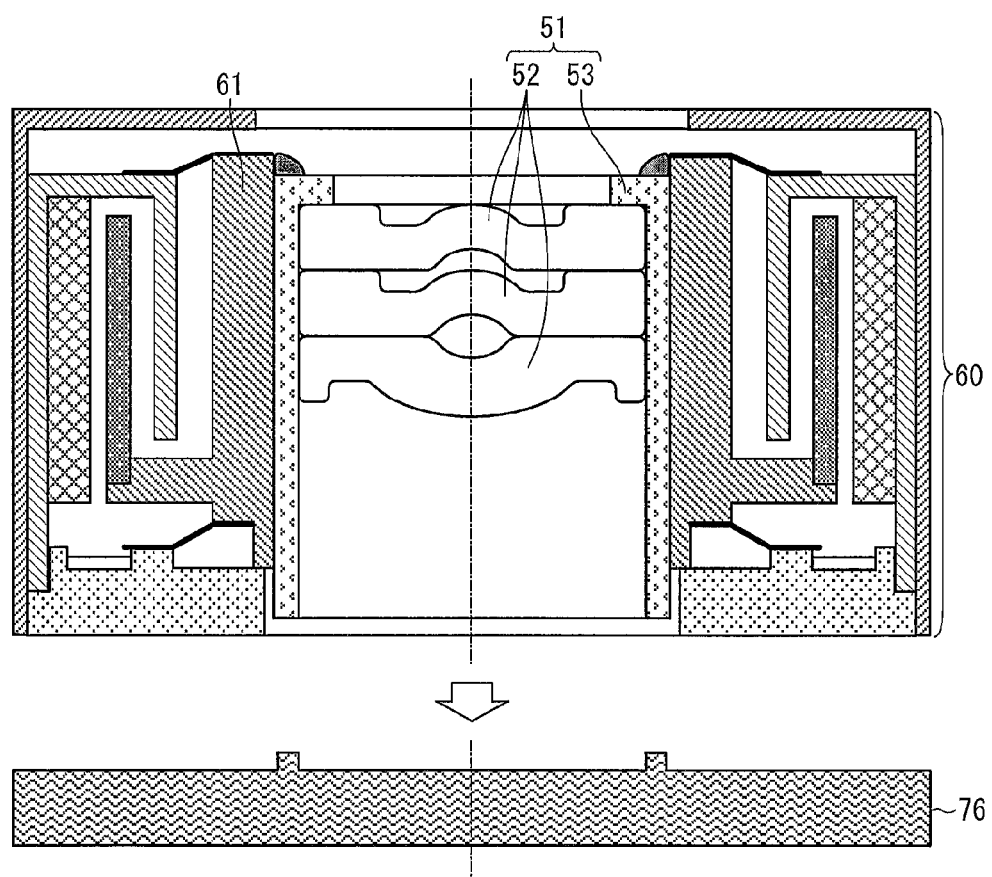

FIG. 18 is a cross sectional view showing a production step for the camera module, showing a state where the dummy sensor cover is removed from the lens driving device.

FIG. 19 is a cross sectional view showing a production step for the camera module, showing a step of replacing the dummy sensor cover with an image pickup section.

FIG. 20 is a cross sectional view showing a production step for the camera module, showing a state where the lens driving device containing an optical section therein is mounted on the image pickup section.

Figure 21:
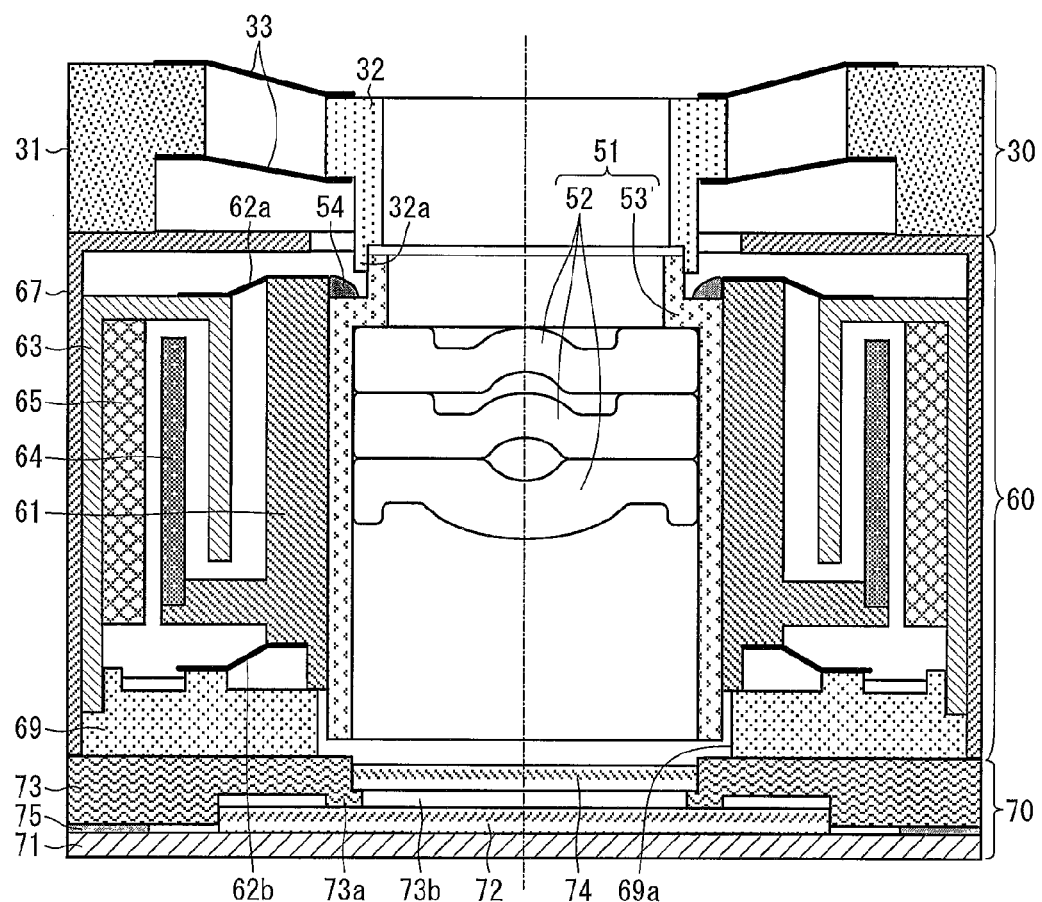

FIG. 21 is a cross sectional view showing another production step for the camera module.

FIG. 22 is a cross sectional view showing still another embodiment of a camera module having an AF function, showing a configuration of the camera module having an AF function.

Figure 23:
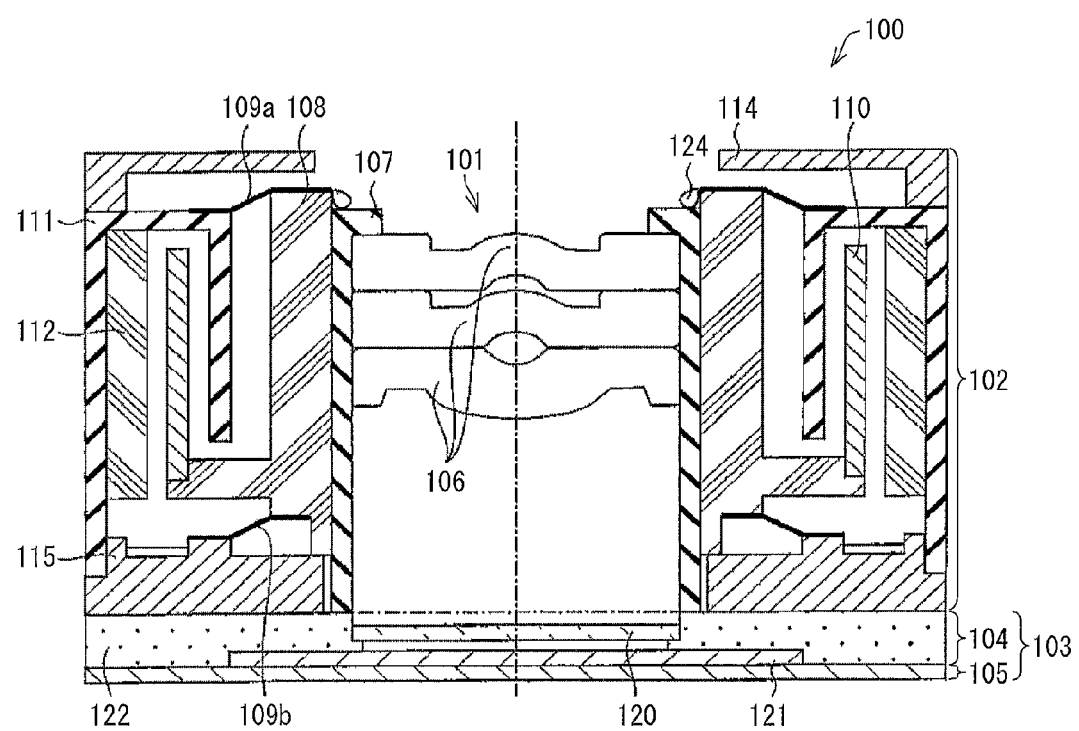

FIG. 23 is a cross sectional view showing a configuration of a conventional camera module.

Figure 24:
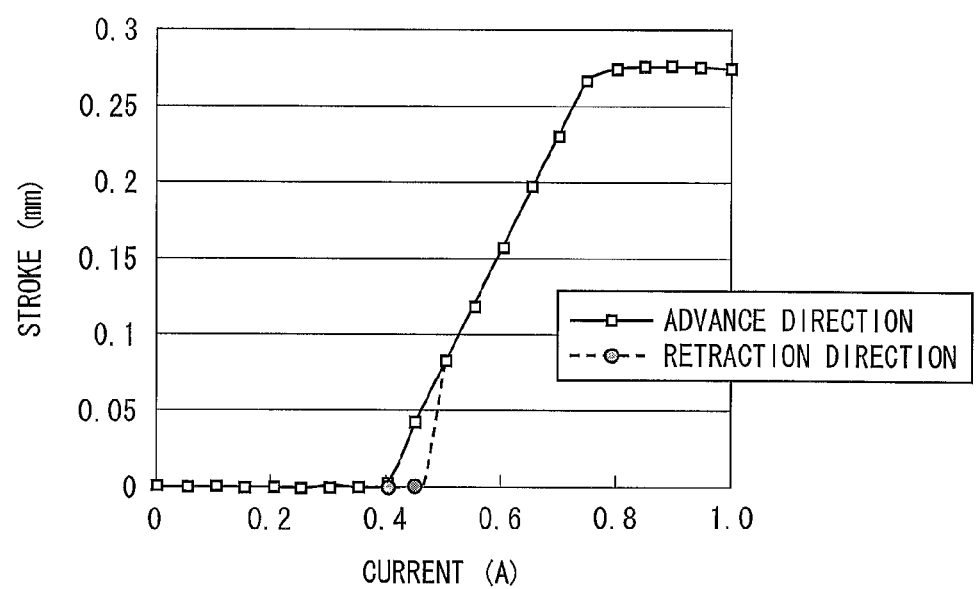

FIG. 24 is a graph showing stroke characteristics in an advance direction and a retraction direction of the optical section of the camera module.

Figure 25:
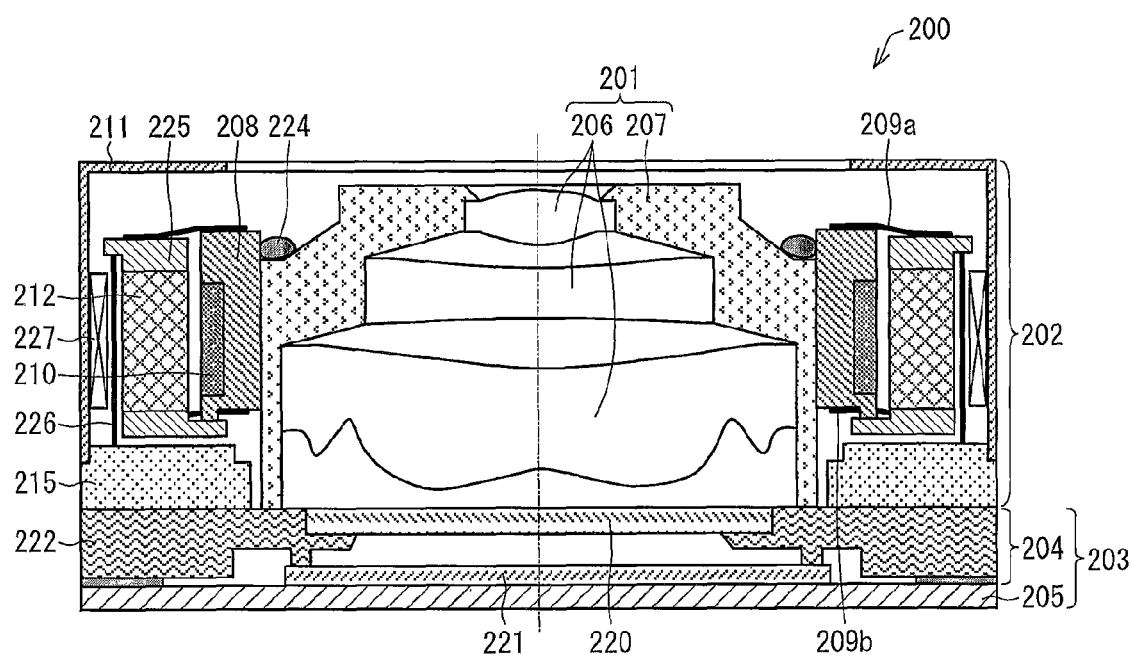

FIG. 25 is a cross sectional view showing a configuration of a camera module having an image stabilization function in accordance with Comparative Example of the present invention.

DESCRIPTION OF EMBODIMENTS

Comparative Example

Initially, prior to the description of one embodiment of the present invention, with reference to FIG. 25, the following description will discuss, as a comparative example, a configuration example of imparting an image stabilization function to an AF camera module as disclosed in Patent Literature 2, i.e. an AF camera module which eliminates the need for adjustment of an initial position of a lens.

FIG. 25 shows a configuration example of applying the arrangement as disclosed in Patent Literature 2, i.e. the arrangement which eliminates the need for adjustment of an initial position of a lens, to the image-stabilizer-equipped camera module as disclosed in Patent Literature 1.

As shown in FIG. 25, a camera module 200 of the Comparative Example includes: an optical section 201 serving as an image pickup optical system; a lens driving device 202 which drives the optical section 201; and an image pickup section 203 which carries out photoelectric conversion of light having passed through the optical section 201. The image pickup section 203 includes a sensor section 204 and a substrate 205 on which the sensor section 204 is mounted. The sensor section 204 includes a glass substrate 220, a sensor chip 221, and a sensor cover 222.

The optical section 201 includes a plurality of image pickup lenses 206 and a lens barrel 207 which holds the image pickup lenses 206. The lens barrel 207 is fixed to a lens holder 208 in the lens driving device 202. The lens holder 208 is supported by two (upper and lower) springs 209a and 209b so as to be movable in an optical axis direction with respect to an intermediate member 225. AF coils 210 are fixed on the periphery of the lens holder 208. A permanent magnet for AF driving and a permanent magnet for image stabilization are fixed to the intermediate member 225. In this example, a permanent magnet 212, which doubles as these two kinds of permanent magnets, is fixed to the intermediate member 225. The intermediate member 225 is supported by four elastic wires 226 in such a manner as to be movable, with respect to a fixed section, in directions of two axes each orthogonal to the optical axis direction. The intermediate member 225, the permanent magnet 212, the springs 209a and 209b, the lens holder 208, the AF coils 210, the lens barrel 207, and the image pickup lenses 206 are driven integrally in the directions orthogonal to the optical axis. The fixed section includes a cover 211, OIS coils 227, and a base 215. The lens driving device 202 is provided on the sensor cover 222.

The lens barrel 207 and the lens holder 208 are not threaded. Accordingly, the lens barrel 207 is so positioned as to abut an upper surface of the sensor cover 222 while the lens holder 208 is located at a mechanical end on an infinite-distance side, and the lens barrel 207 is adhesively fixed to the lens holder 208 with an adhesive 224.

This configuration enables the height of the image pickup lenses 206 with respect to the sensor chip 221 to have only minor tolerances, such as a tolerance for the thickness of the sensor cover 222 and a tolerance for the position where the image pickup lenses 206 are attached in the lens barrel 207. Consequently, positioning of the lenses with high precision can be made without adjusting the height of the lenses with use of a screw.

However, the Comparative Example is different from the example of Patent Literature 2 shown in FIG. 23 in that by virtue of the image stabilization function thus imparted, the lens barrel 207 can be driven in the directions orthogonal to the optical axis as well as in the optical axis direction. The lens barrel 207 is in abutment with the sensor cover 222. Accordingly, driving of the lens barrel 207 in the directions orthogonal to the optical axis causes sliding between the lens barrel 207 and the sensor cover 222. This may result in scraping of reference planes of the lens barrel 207 and the sensor cover 222 and/or generation of foreign matters.

In fact, in a case where the camera module 200 operates as a camera module, the lens barrel 207 is often extended out in the optical axis direction by means of the autofocus function. This does not cause sliding between the lens barrel 207 and the sensor cover 222. However, in a case where the camera module 200 is subjected to external vibration such as shake of a mobile phone while the autofocus function is not operated, the lens barrel 207 and the sensor cover 222 remain in contact with each other, and sliding between the lens barrel 207 and the sensor cover 222 inevitably occurs.

First Embodiment

The following description will discuss one embodiment of the present invention with reference to FIGS. 1 to 11.

A method for producing a camera module having an image stabilization function, a camera module having an image stabilization function, and an electronic apparatus, each in accordance with the present embodiment, solve the problem caused by the Comparative Example. That is, the present embodiment provides a method for producing a small camera module having an image stabilization function, the camera module capable of preventing sliding between a lens barrel and a sensor cover and thus preventing generation of foreign matters due to the sliding, even in a case where the height of an initial position of an image pickup lens is not adjusted with use of a screw; the camera module having an image stabilization function; and an electronic apparatus.

The camera module having an image stabilization function in accordance with the present embodiment has not only an image stabilization function but also an autofocus function.

(Configuration of Camera Module)

Figure 1:
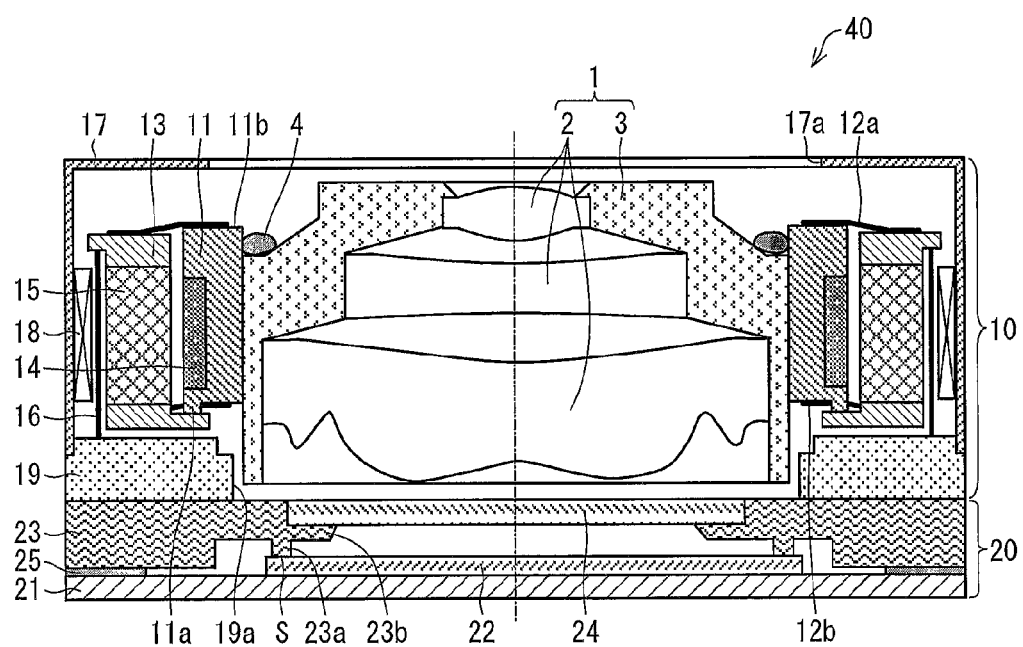
FIG. 1 is a cross sectional view showing one embodiment of a camera module of the present invention, showing a configuration of a camera module having an image stabilization function, taken along an arrow line X-X of the camera module shown in FIG. 2.
Figure 2:
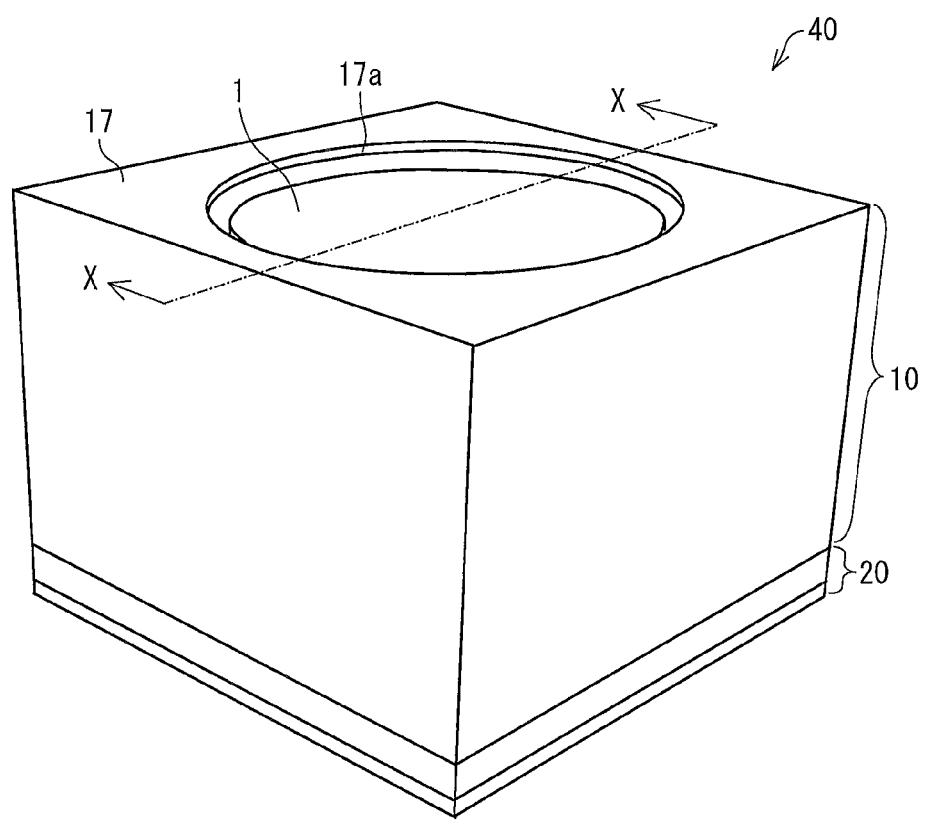
FIG. 2 is a perspective view showing a whole configuration of the camera module having an image stabilization function.

Initially, with reference to FIGS. 1 and 2, the following description will discuss a configuration of the camera module having an image stabilization function in accordance with the present embodiment. FIG. 2 is a perspective view of the camera module having an image stabilization function in accordance with the present embodiment, and FIG. 1 is a cross sectional view taken along an arrow line X-X of the camera module shown in FIG. 2.

A camera module 40 having an image stabilization function in accordance with the present embodiment is a camera module used for an electronic apparatus such as a mobile phone equipped with a camera. The camera module 40 has a substantially rectangular solid shape as shown in FIG. 2. The camera module 40 having an image stabilization function (hereinafter simply referred to as "camera module 40") includes: a rectangular image pickup section 20 provided at a lower part thereof; an optical section 1 contained in a box-shaped module cover 17 which is provided above the image pickup section 20; and a lens driving device 10 which drives the optical section 1. The module cover 17 has, at the center of the upper surface thereof, an opening 17a for exposing image pickup lenses 2 (mentioned later) of the optical section 1. For convenience, the following description assumes that an optical section 1 side is an upper side of the camera module 40, and that an image pickup section 20 side is a lower side of the camera module 40.

As shown in FIG. 1, the optical section 1 of the camera module 40 includes the image pickup lenses 2 and a lens barrel 3 for accommodating the image pickup lenses 2. Around the optical section 1, there is provided the lens driving device 10 for driving the optical section 1, and the lens driving device 10 includes a lens holder 11 which holds the lens barrel 3 of the optical section 1 therein with the lens barrel 3 being adhesively fixed to the lens holder 11 with an adhesive 4.

The image pickup section 20 provided below the lens driving device 10 includes: a substrate 21; an image pickup element 22, provided on the substrate 21, carrying out photoelectric conversion of light having passed through the optical section 1; and a sensor cover 23 and a glass substrate 24 each of which covers the image pickup element 22. The substrate 21, the image pickup element 22, the sensor cover 23, and the glass substrate 24 are stacked in this order in the optical axis direction.

In the lens driving device 10, the lens holder 11 to which the optical section 1 is fixed with the adhesive 4 is supported by two AF (autofocus) springs, i.e. an upper AF spring 12a and a lower AF spring 12b, so as to be movable in the optical axis direction with respect to an intermediate member 13. AF coils 14 are fixed on the periphery of the lens holder 11. A permanent magnet for AF driving and a permanent magnet for image stabilization are fixed to the intermediate member 13. In the present embodiment, a permanent magnet 15, which doubles as these two kinds of permanent magnets, is fixed to the intermediate member 13.

The lens holder 11 has a protrusion 11a at the lower part thereof. The protrusion 11a is in abutment with the intermediate member 13 at a mechanical end on an infinite-distance side in a movable range in the optical axis direction (reference position on the image pickup element side in a movable range). The intermediate member 13 is supported by four elastic wires 16 (two wires shown in the drawing) so as to be movable, with respect to a fixed section, in directions of two axes each orthogonal to the optical axis direction. Thus, the intermediate member 13, the permanent magnet 15, the AF springs 12a and 12b, the lens holder 11, the AF coils 14, the lens barrel 3, and the image pickup lenses 2 are driven integrally in the directions orthogonal to the optical axis.

The fixed section includes a module cover 17, OIS (Optical Image Stabilizer) coils 18, and a base 19. The optical section 1 is embedded in the base 19 in such a manner that the lens barrel 3 partially reaches inside of an opening 19*a* of the base 19. Such a configuration can be often employed because it is difficult to secure a sufficiently large flange focal distance of the image pickup lenses 2 (a distance between the bottom surface of the lens barrel 3 and the top surface of the image pickup element 22).

Here, it is necessary to set a gap between the lens barrel 3 and the opening 19*a* of the base 19 to have an appropriate value. The reason is as follows. When the lens holder 11 is displaced in a lateral direction due to a drop impact or the like, the lateral displacement of the lens holder 11 causes a collision between the lens barrel 3 and the base 19, resulting in a great impact on the lens barrel 3. This may result in breakage of the lens barrel 3 or separation of the image pickup lens 2 from inside the lens barrel 3. In order to avoid such an event, in the present embodiment, the gap between the lens barrel 3 and the opening 19*a* of the base 19 is set to such a value that the lens barrel 3 does not directly abut the base 19 even when the lateral displacement of the lens holder 11 occurs to the maximum amount.

In the image pickup section 20, the sensor cover 23 on which the lens driving device 10 is mounted is placed on the image pickup element 22 in such a manner as to cover the whole image pickup element 22. The sensor cover 23 has a protrusion 23*a* at a lower part thereof, and a reference plane S of an end portion of the protrusion 23*a* is in abutment with the image pickup element 22. The sensor cover 23 has an opening 23*b* at an image pickup lens 2 side of the sensor cover 23, and the opening 23*b* is covered with the glass substrate 24 having an infrared cutting function.

The image pickup element 22 is mounted on the substrate 21. Although a gap between the substrate 21 and the sensor cover 23 may be caused due to a tolerance, the substrate 21 is adhesively fixed to the sensor cover 23 with the gap filled with an adhesive 25.

In the present embodiment, the lens barrel 3 and the lens holder 11 are not threaded, and the lens barrel 3 is fixed at a predetermined position while the lens holder 11 is located at the mechanical end on the infinite-distance side. That is, the camera module 40 is greatly different from the conventional art configuration shown in FIG. 23 in that the lens barrel 3 is not in abutment with the upper surface of the sensor cover 23 at the mechanical end on the infinite-distance side. In the present embodiment, a gap of approximately 10 μm is provided between the lens barrel 3 and the sensor cover 23. A method for producing the camera module 40 in which the lens barrel 3 and the sensor cover 23 are not in abutment with each other, as described above, will be discussed later.

The camera module 40 in accordance with the present embodiment, by virtue of the configuration described above, obviates, even when the image stabilization function is operated at the mechanical end on the infinite-distance side, sliding between the lens barrel 3 and the sensor cover 23, and thus avoids a trouble, such as generation of foreign matters due to the sliding.

(AF Function and Image Stabilization Function of Camera Module)

The following description will discuss an AF function and an image stabilization function of the camera module 40 configured as above in accordance with the present embodiment.

Initially, the AF function is described below. For the sake of focus adjustment, the optical section 1 of the camera module 40 is caused to move back and forth in the optical axis direction in the following manner. A current is caused to pass through the AF coils 14 of the lens driving device 10 under a driving instruction from a control section of, for example, a mobile phone or a digital camera in which the camera module 40 is provided. Thus, the current passing through the AF coils 14 acts on a magnetic field generated from the permanent magnet 15, thus generating a thrust force to move the AF coils 14 in the optical axis direction. This causes the AF springs 12*a* and 12*b* and the lens holder 11 to move the optical section 1 back and forth in the optical axis direction. In this manner, the optical section 1 can be controlled to perform autofocus (AF). Therefore, the AF coils 14, the permanent magnet 15, the AF springs 12*a* and 12*b*, and the lens holder 11 serve as autofocus means of the present invention.

Next, the image stabilization function is described below.

The camera module 40 in accordance with the present embodiment includes an OIS (Optical Image Stabilizer). The optical section 1 is driven integrally in directions orthogonal to the optical axis direction, in the following manner. A current is caused to pass through OIS coils 18 of the lens driving device 10 under a driving instruction from the control section of, for example, a mobile phone or a digital camera in which the camera module 40 is provided. Thus, the current passing through the OIS coils 18 acts on a magnetic field generated from the permanent magnet 15, thus generating a thrust force to move the OIS coils 18 in the directions orthogonal to the optical axis direction. This causes the elastic wires 16, the intermediate member 13, the AF springs 12*a* and 12*b* and the lens holder 11 to move the optical section 1 back and forth in the directions orthogonal to the optical axis direction. In this manner, the optical section 1 can be controlled to perform image stabilization. Therefore, the OIS coils 18, the permanent magnet 15, the elastic wires 16, the intermediate member 13, the AF springs 12*a* and 12*b*, and the lens holder 11 serve as image stabilization means of the present invention.

(Attachment Position of the Optical Section to the Lens Holder)

The following description will discuss the position at which the optical section 1 including the image pickup lenses 2 and the lens barrel 3 is attached to the lens holder 11 of the lens driving device 10.

It is desirable that the image pickup lenses 2 are provided, in the lens holder 11, at such a distance away from the image pickup element 22 that a focal point of the image pickup lenses 2 is located at the mechanical end on the infinite-distance side.

However, an error remains in a case where positioning of the image pickup lenses 2 is carried out with use of a mechanical stopper without focus adjustment. This is because there exist (i) the tolerance in the location at which the image pickup lenses 2 are attached to the lens barrel 3, and (ii) the tolerance in the thickness of the sensor cover 23, resulting in the unevenness of the members. Consequently, it is necessary to find a focal point within a stroke of the lens driving device 10 even when there is such an error. Accordingly, it is necessary to attach the image pickup lens 2 to the lens holder 11 at a position which is slightly shifted from a designed center location of the focal point to the image pickup element 22. Such a slight shift is referred to as "over infinity". As the over infinity is set to be large, the stroke of the lens driving device 10 becomes large accordingly. The over infinity therefore needs to be kept to a minimum.

According to cumulative total of the variety of tolerances above, the amount of an appropriate over infinity is approximately 25 μm. However, since this value is susceptible to the tolerances for manufacturing and assembling of the members, it is desirable that the over infinity is set to a realistic minimum one. In a structure of the camera module 40 in accordance with the present embodiment, a reference plane S (on the bottom part) of the sensor cover 23 is caused to directly abut the image pickup element 22. Furthermore, using the sensor cover 23, in which thickness accuracy is improved, highly precise positioning of the lens barrel 3 is carried out with respect to the upper plane of the sensor cover 23 (in other words, with respect to the lower plane of the lens driving device 10 since the lower reference plane of the lens driving device 10 is mounted on the upper plane of the sensor cover 23). Such a structure allows the camera module 40 to achieve the over infinity of approximately 25 μm.

Assume that in FIG. 1, the lens barrel 3 is provided at a position which is shifted closer by 25 μm to the image pickup element 22 from a location where an object at infinity is to be focused, while a gap exists between the sensor cover 23 and the lens barrel 3. A description will be provided below based on the assumption.

As shown in FIG. 1, the lens barrel 3 is positioned with respect to the lens holder 11, and the lens barrel 3 is then fixed to the lens holder 11 with the adhesive 4. In the present embodiment is arranged such that the adhesive 4 does not flow into a part where the adhesive 4 is not required. Specifically, a position where the adhesive 4 is applied to the lens holder 11 is set to be lower than a top plane 11b of the lens holder 11, which top plane 11b is opposite to a bottom plane of the lens holder 11 on a sensor cover 23 side. The top plane 11b of the lens holder 11 may be elongated toward a top surface, i.e. toward the module cover 17. Furthermore, the position where the adhesive 4 is applied to the lens barrel 3 may be lowered.

The lens holder 11 does not necessarily have a perfect cylindrical shape. Normally, the adhesive 4 is applied to the lens barrel 3 at approximately four points near the circumference of the lens barrel 3. Accordingly, the lens holder 11 may be constituted by, for example, four split parts spaced at a distance therebetween. In this case, the lens holder 11 forms not the entire walls of an imaginary cylinder but partial walls of the cylinder. This may cause the lens holder 11 to have a lower strength. The lens holder 11 of a low strength increases the risk of being broken or chipped when an impactive force is directly applied onto the top plane 11b of the lens holder 11 due to a drop impact or the like. For this reason, in order to avoid an impactive force from being directly applied onto the lens holder 11, it is desirable to provide a gap between the top plane 11b of the lens holder 11 and the module cover 17 within a range where the lens holder 11 is movable, so that a collision between the top plane 11b and the module cover 17 can be prevented.

(Method for Producing Camera Module)

Another main feature of the camera module 40 in accordance with the present embodiment lies in that the camera module 40 eliminates the need for adjusting the height of the lens barrel 3 with use of a screw, while preventing sliding between the lens barrel 3 and the sensor cover 23.

The conventional technique of adjusting the height of an initial position of a lens barrel with use of a screw can easily prevent sliding between the lens barrel 3 and the sensor cover 23. However, in order to determine the height of the lens barrel without adjusting the height of the initial position, it is necessary to determine the position by causing the lens barrel to abut a member of some kind. Accordingly, the conventional technique of causing the lens barrel 3 to abut the sensor cover 23 inevitably results in sliding between the lens barrel 3 and the sensor cover 23.

In contrast, the camera module 40 in accordance with the present embodiment is also distinguished by a production method which determines an initial position of the lens barrel 3 with high precision without causing the lens barrel 3 to abut a member such as the sensor cover 23.

With reference to FIGS. 3 to 9, the following description will discuss a production method which (i) determines an initial position of the lens barrel 3 with high precision and (ii) fixes the lens barrel 3, without use of a screw for focus adjustment at an initial position and without height adjustment. FIGS. 3 to 9 are views showing production steps of the camera module 40.

Figure 3:
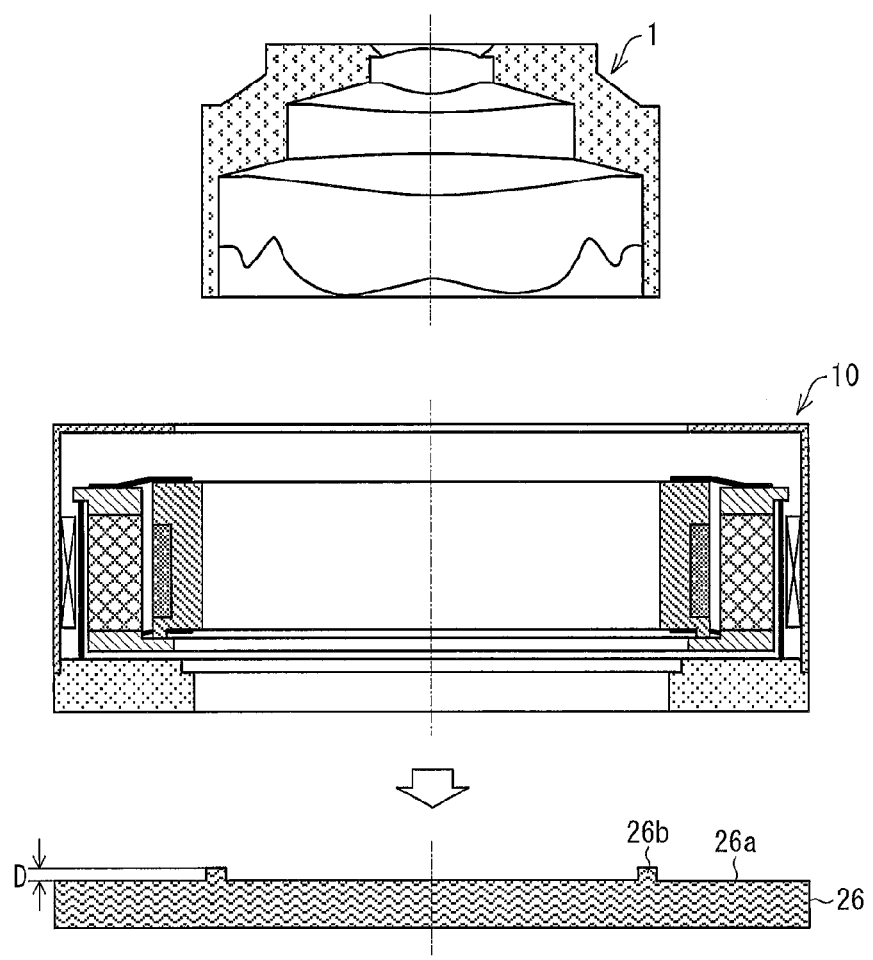
FIG. 3 is a cross sectional view showing a production step for the camera module, showing a step of preparing a dummy sensor cover serving as a jig.

Initially, with reference to FIG. 3, the following description will discuss the steps of preparing the optical section 1, the lens driving device 10, and a dummy sensor cover 26 and then mounting the lens driving device 10 on the dummy sensor cover 26.

Specifically, as shown in FIG. 3, for the camera module 40 in accordance with the present embodiment, the dummy sensor cover 26 serving as a jig is prepared for use in the production of the camera module 40. The dummy sensor cover 26 has (i) a flat plane 26a on which the lens driving device 10 is to be mounted and (ii) a protrusion 26b protruding from the flat plane 26a. A difference D in height between the protrusion 26b and the flat plane 26a may be set as a gap for preventing the lens barrel 3 from making contact with the sensor cover 23 and/or the glass substrate 24 when the lens barrel 3 is displaced in directions orthogonal to the optical axis. Normally, if the difference D is not less than approximately 5 μm to 10 μm, the difference D can serve as a gap. A designed value of the difference D may be 5 μm or 10 μm, but it is desirable to prepare the dummy sensor cover 26 with the difference D as close to the designed value as possible. In the description with reference to FIG. 1, the designed value of the difference D is approximately 10 μm.

Figure 4:
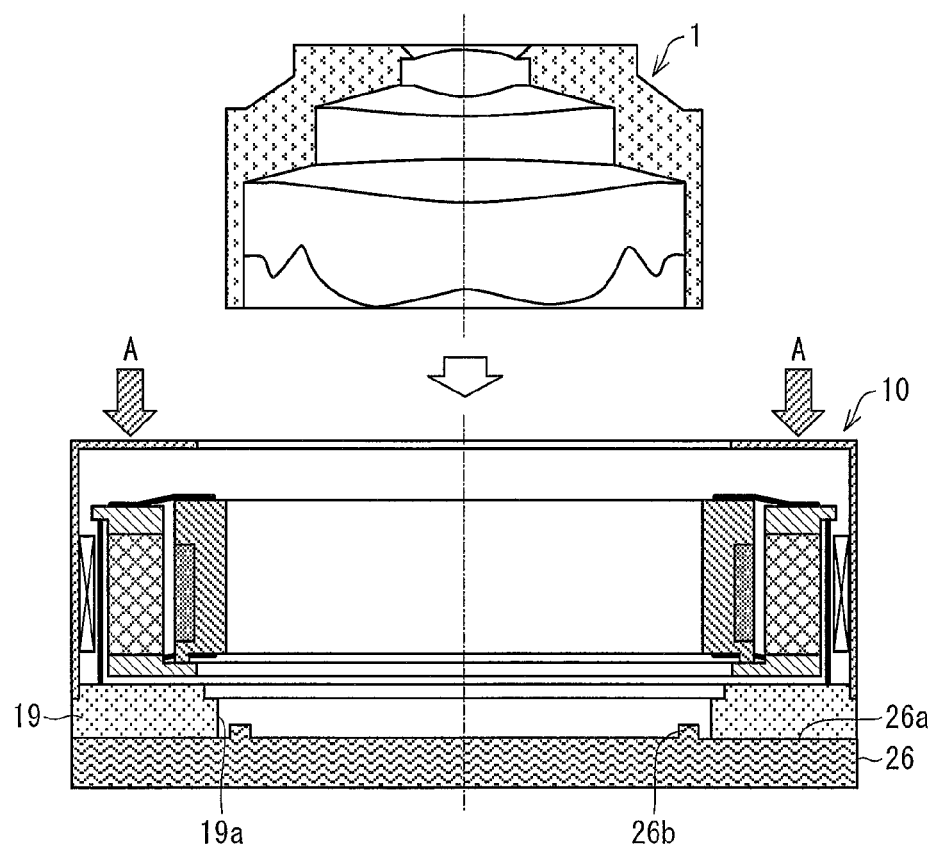
FIG. 4 is a cross sectional view showing a production step for the camera module, showing a state where a lens driving device is mounted on the dummy sensor cover.

With reference to FIG. 4, the following description will discuss a state where the lens driving device 10 is mounted on the dummy sensor cover 26.

As described above, the lens driving device 10 is mounted on the flat plane 26a of the dummy sensor cover 26, so that the protrusion 26b reaches inside the opening 19a of the base 19 in the lens driving device 10.

During a period in which the lens driving device 10 is mounted on the flat plane 26a of the dummy sensor cover 26, it is desirable to apply a pressing force on the lens driving device 10 in a direction indicated by a hatched arrow A in FIG. 4. The reason is as follows. As described above, since it is necessary to determine the position of the lens barrel 3 with high precision with respect to the bottom plane of the lens driving device 10, the lens driving device 10 being lifted with respect to the dummy sensor cover 26 would result in deterioration in accuracy. Accordingly, it is preferable to apply the pressing force as above.

Figure 5:
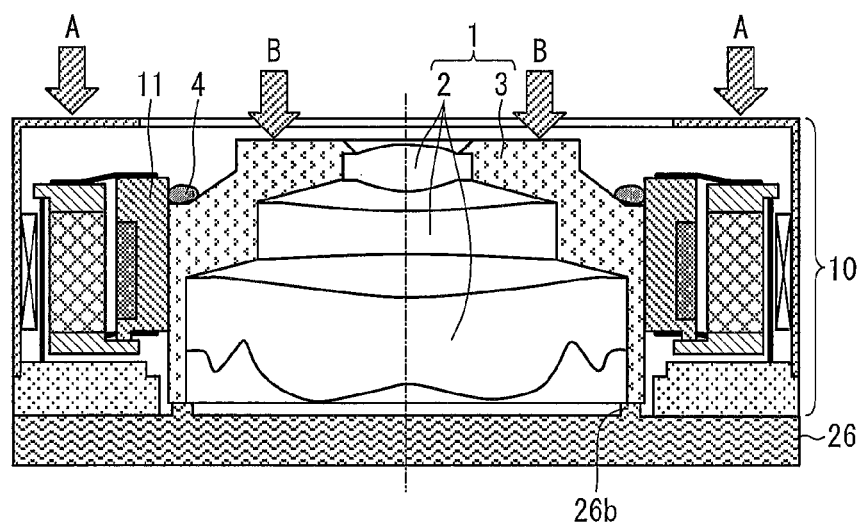
FIG. 5 is a cross sectional view showing a production step for the camera module, showing a state where a lens barrel is mounted on the lens driving device in such a manner that the lens barrel touches a protrusion of the dummy sensor cover.

With reference to FIG. 5, the following description will discuss a state where the lens barrel 3 (optical section 1) is mounted on the lens driving device 10 in such a manner as to abut the protrusion 26b of the dummy sensor cover 26.

As shown in FIG. 5, the shape of the lens barrel 3 is designed such that while the bottom plane of the lens barrel 3 is in abutment with the protrusion 26*b* of the dummy sensor cover 26, the image pickup lenses 2 are located at a position shifted closer by 25 μm to the image pickup element 22 from a focal point located on the infinite-distance side. Of course, an actual shape of the lens barrel 3 exhibits a tolerance with respect to the designed value. During a period in which the bottom plane of the lens barrel 3 is in abutment with the protrusion 26*b* of the dummy sensor cover 26, it is desirable to apply a pressing force in a direction indicated by a hatched arrow B in FIG. 5. It is desirable that the aforementioned pressing force applied on the lens driving device 10, which force is indicated by the hatched arrow A in FIG. 4, is continuously applied. Since reference positions of the lens barrel 3 and the lens driving device 10 are set by a mechanical stopper, lifting of the lens barrel 3 and the lens driving device 10 would result in errors in their reference positions. With the pressing force applied as above (in such a state that lifting of the lens barrel 3 and the lens driving device 10 is prevented), the lens barrel 3 is adhesively fixed to the lens holder 11 with the adhesive 4.

Figure 6:
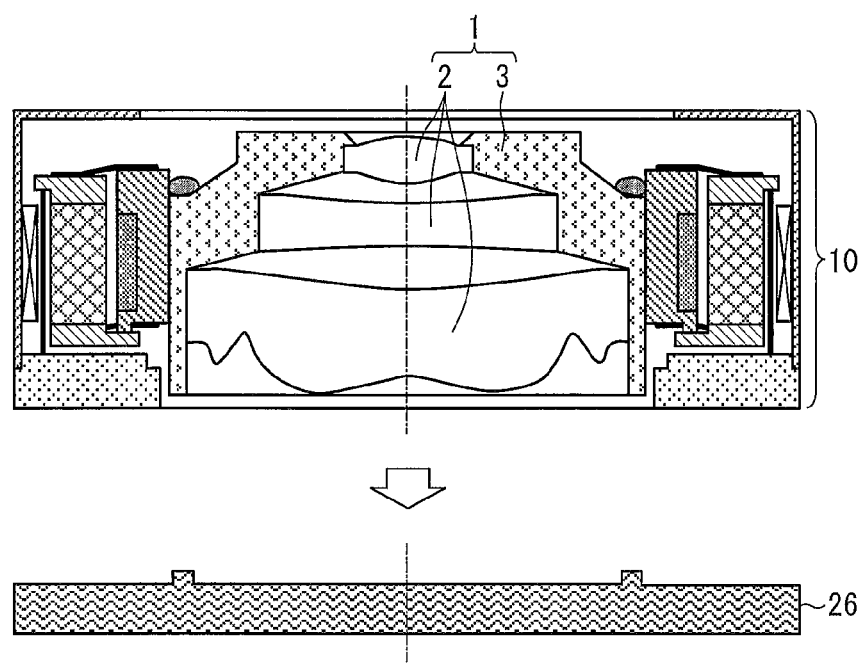
FIG. 6 is a cross sectional view showing a production step for the camera module, showing a state where the dummy sensor cover is removed from the lens driving device.

With reference to FIG. 6, the following description will discuss a state where the dummy sensor cover 26 is removed from the lens driving device 10.

As shown in FIG. 6, the dummy sensor cover 26 is a jig for positioning the lens barrel 3, and becomes unnecessary after the lens barrel 3 has been adhesively fixed to the lens holder 11.

Figure 7:
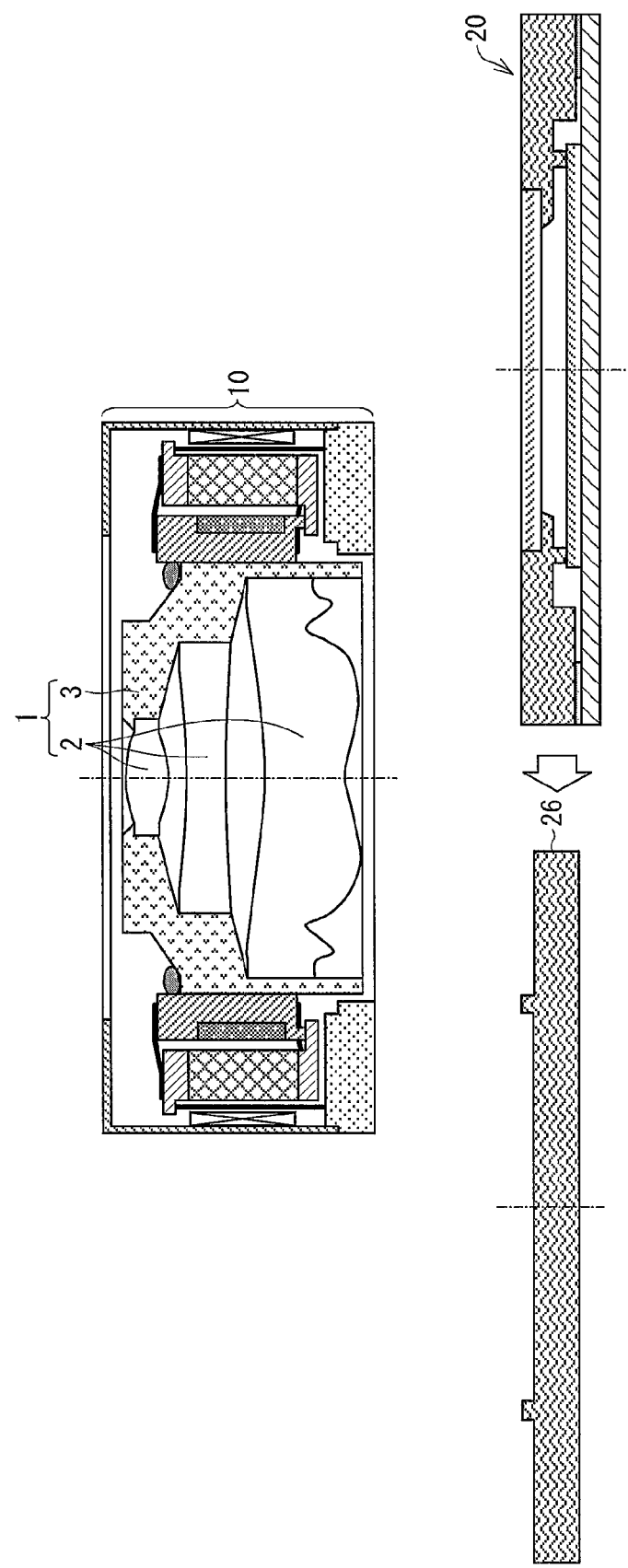
FIG. 7 is a cross sectional view showing a production step for the camera module, showing a step of preparing an image pickup section and replacing the dummy sensor cover with the image pickup section.

With reference to FIG. 7, the following description will discuss the step of preparing the image pickup section 20 and then replacing the dummy sensor cover 26 with the image pickup section 20.

As shown in FIG. 7, instead of the dummy sensor cover 26, the image pickup section 20 including the image pickup element 22 needs to be connected to the lens driving device 10 into which the optical section 1 has been already fixed.

Figure 8:
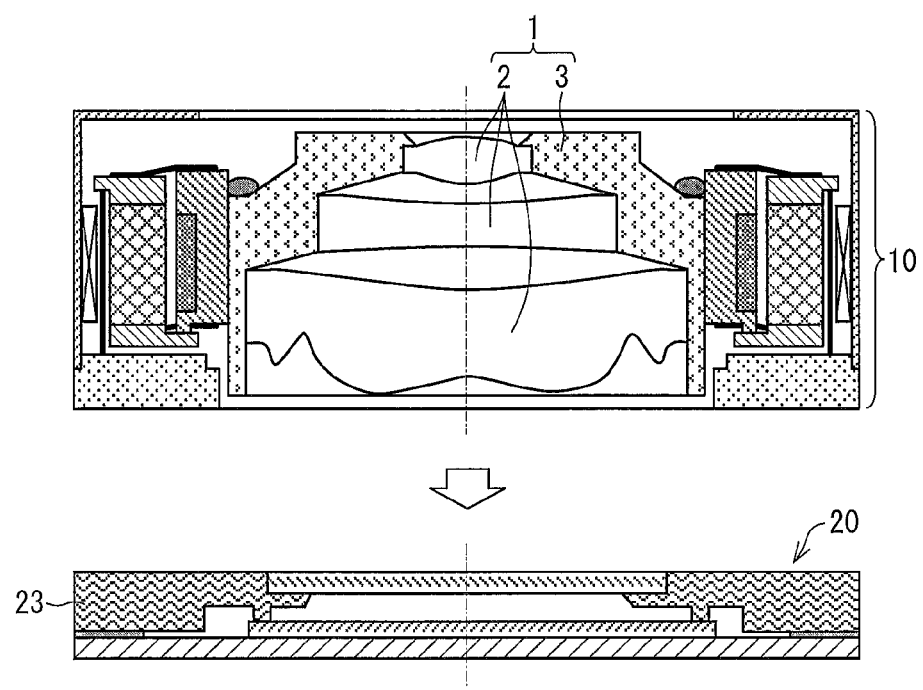
FIG. 8 is a cross sectional view showing a production step for the camera module, showing a step of mounting the lens driving device containing an optical section therein on the image pickup section.

With reference to FIG. 8, the following description will discuss the step of mounting, on the image pickup section 20, the lens driving device 10 including the optical section 1 therein.

As shown in FIG. 8, the lens driving device 10 including the optical section 1 therein is mounted on the upper surface of the sensor cover 23 of the image pickup section 20, and then adhesively fixed to the sensor cover 23 with an adhesive (not shown).

Figure 9:
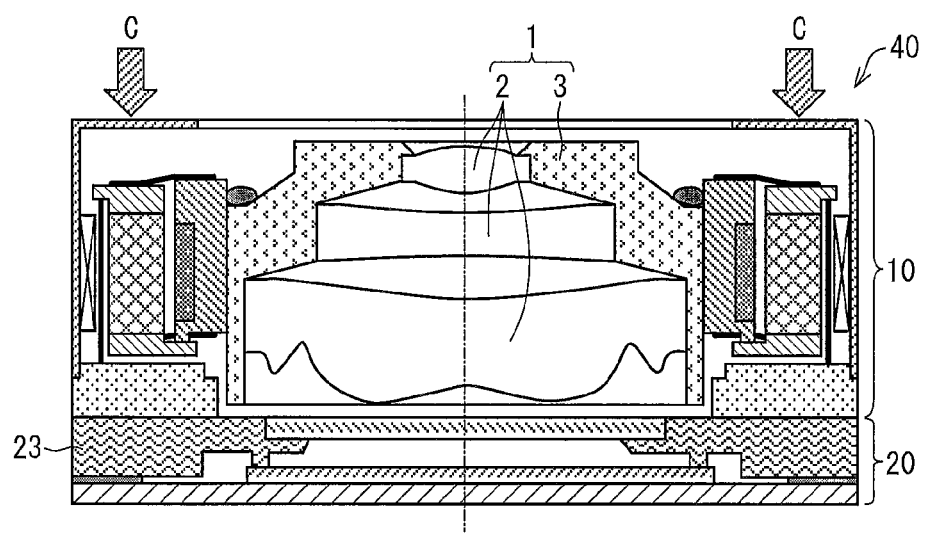
FIG. 9 is a cross sectional view showing a production step for the camera module, showing a state where the lens driving device containing the optical section therein is mounted on the image pickup section.

With reference to FIG. 9, the following description will discuss a state where the lens driving device 10 including the optical section 1 therein is mounted on the image pickup section 20.

As shown in FIG. 9, it is desirable to apply a pressing force in a direction indicated by a hatched arrow C in FIG. 9 until the adhesive with which the lens driving device 10 is adhered to the sensor cover 23 is cured to have a required strength. The application of such a pressing force is, for the same reason as above, intended to prevent the lens driving device 10 from being lifted with respect to the upper surface of the sensor cover 23.

The method as described above allows production of the camera module 40 in which the image pickup lenses 2 are positioned with high precision and in which a gap is provided between the lens barrel 3 and the sensor cover 23.

It is desirable that the dummy sensor cover 26 explained above is made of a non-magnetic material. In a case where the dummy sensor cover is made of a magnetic material, the permanent magnet 15 mounted on the OIS movable section of the lens driving device 10 is attracted by such a dummy sensor cover. This may cause the lens barrel 3 to be fixed while the position of the lens holder 11 is changed or while the lens holder 11 is inclined. In this case, the removal of the dummy sensor cover may cause the lens holder 11 to be put back in its original position, so that the attachment location of the lens barrel 3 becomes eccentric or inclined. This may result in inclination of the lens barrel 3. Therefore, it is desirable that at least the dummy sensor cover 26 is made of a non-magnetic material, and it is more desirable that other jigs and tools positioned around the lens driving device 10 are made of non-magnetic materials, too.

(Examination on Inclination of Lens Holder)

In the camera module 40 in accordance with the present embodiment, (i) the height of the position where the lens barrel 3 is attached and (ii) the inclination of the lens barrel 3 are regulated with the dummy sensor cover 26 as a reference. Conversely, even if a cylindrical hole of the lens holder 11 to which hole the lens barrel 3 is to be attached is inclined, the lens barrel 3 is not influenced by the inclination provided that the inclination is within a tolerable range, and it is thus possible to realize the camera module 40 with a small initial inclination, i.e. with a small static tilt. With reference to (a) and (b) of FIG. 10, the following description will discuss the tolerable range of the tilt of the lens holder 11. (a) of FIG. 10 is a cross sectional view of a main part, for explaining the influence of the inclination of the lens holder 11, and (b) of FIG. 10 is a view showing a state where the lens holder 11 is inclined.

The cross sectional view of the camera module 40 shown in FIG. 1 omits a detailed outer shape of the lens barrel 3. The actual lens barrel 3 is provided such that as shown in (a) of FIG. 10, a maximum external diameter portion 3*a* does not exist along an entire height of the lens barrel 3, but exists only at a limited portion of the lens barrel 3, and the other circumferential portions of the lens barrel 3 are provided with slightly smaller diameters. Here, assume that $D_E$ represents an external diameter of the maximum external diameter portion 3*a* of the lens barrel 3, H represents a thickness of the maximum external diameter portion 3*a* of the lens barrel 3, and $D_I$ represents a cylindrical internal diameter of the lens holder 11.

Here, as shown in (b) of FIG. 10, an inclination angle $\theta_1$ at which the maximum external diameter portion 3*a* of the lens barrel 3 makes contact with the lens holder 11 is represented, with use of the external diameter $D_E$ and the thickness H, by the following equation:

$$\theta_1 = \tan^{-1}(H/D_E).$$

Here, assume that the external diameter $D_E$ is 5 mm and the thickness H is 0.5 mm. In this case, the inclination angle $\theta_1$ is 5.71 degrees. Normally, the inclination angle θ of the lens holder 11 does not reach 5.71 degrees, and a relation between the inclination angle θ of the lens holder 11 and the inclination angle $\theta_1$ is as shown in (b) of FIG. 10. Accordingly, a difference $\theta_2$ between the inclination angle θ and the inclination angle $\theta_1$ is represented by the following equation:

$$\theta_2 = \cos^{-1}(D_I/\sqrt{(D_E^2 + H^2)}).$$

Accordingly, the tolerable inclination angle θ of the lens holder 11 is represented by $$\theta \leq \theta_1 - \theta_2 = \tan^{-1}(H/D_E) - \cos^{-1}(D_I/\sqrt{(D_E^2 + H^2)}).$$

In a case where the inclination angle θ of the lens holder 11 falls in this range, the inclination of the lens barrel 3 is not increased by the inclination of the lens holder 11, so that the lens barrel 3 can be fixed with the dummy sensor cover 26 as a reference. This allows realizing the camera module 40 with a small inclination angle.

For example, in a case where the cylindrical internal diameter $D_I$ is 5.005 mm, the difference $\theta_2$=5.11 degrees, and the tolerable inclination angle is $\theta$=0.6 degrees.

(Another Method for Producing Camera Module)

With reference to FIG. 11, the following description will discuss another production method different from the aforementioned method. FIG. 11 is a cross sectional view for explaining another method for producing the camera module 40 in accordance with the present embodiment.

In a case where the camera module 40 is produced by another method, initially, a height adjustment device 30 is provided on an upper surface of the lens driving device 10, as shown in FIG. 11.

As shown in FIG. 11, the height adjustment device 30 includes a seat 31 fixed to the lens driving device 10, an arm section 32 for holding the lens barrel 3, a support spring 33 for supporting the arm section 32 in such a manner that the arm section 32 is movable in an optical axis direction with respect to the seat 31, and the like.

Means for driving the arm section 32 is not shown in particular. The arm section 32 may be driven by a voice coil motor as in the case of the lens driving device 10, or may be driven by driving means such as a piezoelectric element. Furthermore, a grasping section 32a provided at an end of a lower part of the arm section 32 may be made openable/closable, so that the grasping section 32a can firmly grasp the lens barrel 3 by a pressurizing spring (not shown). As described above, the arm section 32 is moved up and down by the driving means (not shown) while grasping the lens barrel 3, and the lens barrel 3 is then adhesively fixed to the lens holder 11 with the adhesive 4 at a position where a focus has been detected.

Thus, it is important to provide a gap between the lens barrel 3 and the sensor cover 23, with the lens barrel 3 being adhesively fixed to the lens holder 11. In the present embodiment, since the height of the lens barrel 3 is adjusted, an excess stroke corresponding to the over infinity is not required. In view of the stroke of the lens driving device 10, it is most desirable to position the lens barrel 3 with over infinity which can cover an adjustment error (about several micrometers) that may occur in a slight amount. After the lens barrel 3 has been adhesively fixed, the arm section 32 stops holding the lens barrel 3 and releases the lens barrel 3, and the height adjustment device 30 is removed from the lens driving device 10.

The adjustment method as above eliminates the need for carrying out screwing for focus adjustment at an initial position, thus eliminating the need for application of a force of a large strength. Only a minor friction force is applied on the lens holder 11 when the lens barrel 3 is inserted into the lens holder 11. Accordingly, a low risk of damage to a spring for supporting the movable section can be achieved, and a positional change due to the deformation of the spring can be reduced to a minimum.

As described above, the camera module 40 in accordance with the present embodiment includes: the optical section 1 including the image pickup lenses 2 and the lens barrel 3 holding the image pickup lenses 2; and the lens driving device 10 which includes the lens holder 11 holding the optical section 1 and which drives the optical section 1 and the lens holder 11 integrally in an optical axis direction and in directions orthogonal to the optical axis. The optical section 1 and the lens driving device 10 are provided on the upper side of the sensor cover 23 which covers the image pickup element 22 of the image pickup section 20. The lens barrel 3 is positioned at such a location that the lens barrel 3 does not make contact with the sensor cover 23, so that the lens barrel 3 is fixed to the lens holder 11 at the location. Furthermore, before being fixed, the lens barrel 3 is slidable in the optical direction with respect to the lens holder 11.

With the arrangement, the lens barrel 3 is caused to slide in the optical axis direction with respect to the lens holder 11 in order to be positioned at such a location that the lens barrel 3 does not make contact with the sensor cover 23, and thereafter the lens barrel 3 is fixed to the lens holder 11.

Consequently, it is unnecessary to adjust the height of the initial position of the image pickup lens 2 with use of a screw, and it is possible to simplify or omit a step of adjusting a focus at the initial position. Furthermore, even when the present invention is applied to the camera module 40 having both of an autofocus function and an image stabilization function, it is possible to prevent sliding between the lens barrel 3 and the sensor cover 23 and to thus prevent generation of foreign matters or the like event due to the sliding. Furthermore, since it is unnecessary to adjust the height of the initial position of the image pickup lenses 2 with use of a screw, the present invention is applicable to a small camera module having an image stabilization function.

Therefore, it is possible to provide the small camera module 40 capable of preventing sliding between the lens barrel 3, which holds the image pickup lenses 2, and the sensor cover 23 of the image pickup section 20 and thus preventing generation of foreign matters due to the sliding, even in a case where the height of the initial position of the image pickup lenses 2 is not adjusted with use of a screw.

Furthermore, it is possible to reduce the cost, etc. for molds for causing the lens barrel 3 and the lens holder 11 to have threaded parts used for the focus adjustment at the initial position, and the need for a step of carrying out screwing for the focus adjustment at the initial position is eliminated.

Furthermore, the camera module 40 in accordance with the present embodiment is arranged such that the height position of the optical section 1 is determined with use of a jig.

Furthermore, the method for producing the camera module 40, in accordance with the present embodiment, is a method for producing the camera module 40 including: the optical section 1 having the image pickup lenses 2 and the lens barrel 3 holding the image pickup lenses 2; and the lens driving device 10 which includes the lens holder 11 holding the optical section 1 and which drives the optical section 1 and the lens holder 11 integrally with each other in an optical axis direction and in directions orthogonal to the optical axis, the optical section 1 and the lens driving device 10 being provided on the sensor cover 23 which covers the image pickup element 22 of the image pickup lens 2. The method includes the steps of: sliding the lens barrel 3 of the optical section 1 in the optical axis direction with respect to the lens holder 11 of the lens driving device 10, and carrying out positioning of the optical section 1 with use of a jig by determining the height position of the optical section 1 so that the lens barrel 3 is located at such a position that the lens barrel 3 does not make contact with the sensor cover 23, and then fixing the optical section 1 to the lens driving device 10.

As described above, a vertical position of the image pickup lens 2 is determined by using a jig. This eliminates the need for the step of carrying out screwing for the focus adjustment at the initial position, and makes it possible to simplify the focus adjustment at the initial position.

Therefore, it is possible to provide (i) the small camera module 40 capable of preventing sliding between the lens barrel 3, which holds the image pickup lenses 2, and the sensor cover 23 of the image pickup section 20 and thus preventing generation of foreign matters due to the sliding even in a case where the height of the initial position of the image pickup lenses 2 is not adjusted with use of a screw, and (ii) a method for producing the camera module 40.

The camera module 40 in accordance with the present embodiment is arranged such that the dummy sensor cover 26 serving as a jig is constituted by a flat plate having the protrusion 26b. Furthermore, the height of the initial position of the optical section 1 is determined with use of the jig in such a manner that a top plane of the protrusion 26b of the dummy sensor cover 26 is caused to abut a bottom plane of the optical section 1 which bottom plane is located on the image pickup element 22 side.

Furthermore, the method for producing the camera module 40, in accordance with the present embodiment, may be arranged such that the step of sliding the lens barrel 3 of the optical section 1 in the optical axis direction with respect to the lens holder 11 of the lens driving device 10 is carried out after the optical section 1 is inserted into the lens driving device 10 while the lens driving device 10 is mounted on the dummy sensor cover 26 serving as the jig, the step of fixing the optical section 1 to the lens driving device 10 is carried out while a part of the optical section 1 is caused to abut a reference plane of the dummy sensor cover 26, and the dummy sensor cover 26 is replaced with the image pickup section 20, and the lens driving device 10 is then fixed to the sensor cover 23 of the image pickup section 20.

Thus, a vertical position of the image pickup lens is determined by causing the optical section 1 to abut the jig. This eliminates the need for the step of carrying out screwing for the focus adjustment at the initial position and also eliminates the need for the focus adjustment itself.

Furthermore, the camera module 40 in accordance with the present embodiment is arranged such that the height adjustment device 30 serving as a jig has the grasping section 32a which grasps the lens barrel 3 of the optical section 1 in such a manner that the lens barrel 3 is slidable, with respect to the lens holder 11, in the optical axis direction, and the height of the initial position of the optical section 1 is determined with use of the height adjustment device 30 serving as a jig in such a manner that the grasping section 32a of the height adjustment device 30 grasps the lens barrel 3 of the optical section 1 so as to displace the optical section 1 in the optical axis direction.

Thus, the positioning can be made merely by moving the optical section 1 upward and downward in the optical axis direction by means of the height adjustment device 30 serving as a jig which grasps the lens barrel 3. Consequently, it is possible to eliminate the need for the step of carrying out screwing for the focus adjustment at the initial position, and to simplify the focus adjustment at the initial position.

Furthermore, the camera module 40 in accordance with the present embodiment is arranged such that the lens driving device 10 includes, on a sensor cover 23 side, the base 19 supporting the lens holder 11 so that the lens holder 11 freely swings, the base 19 having the opening 19a to which the lens barrel 3 is fit loosely, and a gap between the opening 19a of the base 19 and the lens barrel 3 is so set that the base 19 does not make contact with the lens barrel 3 even when the lens holder 11 is displaced to a maximum extent toward the lens barrel 3.

Consequently, even in a case where the camera module 40 undergoes a drop impact or the like event, a part that defines a movable range of the lens driving device 10 (a part serving as a stopper) makes contact with the base 19 firstly. This avoids the lens barrel 3 from directly colliding with the base 19, thus making it possible to protect the lens barrel 3 from damage caused by the drop impact.

Furthermore, the camera module 40 in accordance with the present embodiment is arranged such that the lens barrel 3 having been positioned is fixed to the lens holder 11 with the adhesive 4, and a position where the adhesive 4 is applied to the lens holder 11 is lower than a top plane 11b of the lens holder 11, the top plan 11b being opposite to a bottom plane of the lens holder 11 which bottom plane is located on the sensor cover 23 side.

This allows the inner wall of the lens holder 11 to prevent the adhesive 4 for fixing the lens barrel 3 from flowing out over the top plane 11b of the lens holder 11.

Furthermore, the camera module 40 in accordance with the present embodiment is arranged such that the module cover 17 having, at a center thereof, the opening 17a for exposing the lens barrel 3 is so provided as to cover the lens holder 11 and the lens barrel 3. The lens holder 11 is so placed as not to make contact with the module cover 17 even when the lens barrel 3 moves to a maximum extent.

With this arrangement, even in a case where the lens holder 11 is small in thickness and small in strength, the top plane 11b of the lens holder 11 which plane is located on the module cover 17 side does not make contact with the module cover 17. This allows preventing the lens holder 11 from damage caused by a drop impact or the like.

Furthermore, the camera module 40 in accordance with the present embodiment is arranged such that the dummy sensor cover 26 is made of only a non-magnetic material.

If a dummy sensor cover is made of a magnetic material, the lens holder 11, which includes the permanent magnet 15, would be likely to be displaced due to magnetism of the dummy sensor cover when the lens barrel 3 is to be fixed to the lens holder 11. In contrast, since the dummy sensor cover 26 is made of only a non-magnetic material, the lens holder 11 is not caused to be excessively displaced when the lens barrel 3 is to be fixed to the lens holder 11. Accordingly, it is possible to fix the lens barrel 3 to the lens holder 11 with high precision.

The camera module 40 in accordance with the present embodiment is arranged such that the inclination angle θ of the lens holder 11 with respect to a surface of the sensor cover 23 is set to meet the relation $$\theta \leq \tan^{-1}(H/D_E) - \cos^{-1}(D_I/\sqrt{D_E^2+H^2})$$

wherein $D_E$ represents an external diameter of the maximum external diameter portion 3a of the lens barrel 3, H represents a thickness of the maximum external diameter portion 3a of the lens barrel 3, and $D_I$ represents a cylindrical internal diameter of the lens holder 11.

In the present embodiment, in a case where the lens barrel 3 is installed in the lens driving device 10, the dummy sensor cover 26 is used for adjustment of a distance between the lens barrel 3 and the sensor cover 23. In this case, the lens barrel 3 is inserted into a cylindrical hole of the lens holder 11 while being slid in the cylindrical hole, and the lens barrel 3 is positioned and fixed with the lens barrel 3 mounted on the dummy sensor cover 26. Accordingly, the inclination of the lens barrel 3 depends on a degree of precision with which the lens barrel 3 is mounted on the mounting plane of the dummy sensor cover 26. However, in a case where the cylindrical hole of the lens holder 11 is inclined more than necessary, there is a possibility that the lens barrel 3 is fixed in conformity with the cylindrical hole of the lens holder 11 and is, in turn, mounted on the plane of the dummy sensor cover 26 with poor precision.

Therefore, inclination of the lens holder 11 more than necessary with respect to a surface of the sensor cover 23 which surface is a reference plane of the sensor cover 23 on which plane the lens driving device 10 is to be mounted, causes inclination of the cylindrical hole of the lens holder 11 with respect to the dummy sensor cover 26 when the lens driving device 10 is mounted on the dummy sensor cover 26 in order to install the lens barrel 3. This may cause the lens barrel 3 to be attached to the sensor cover 23 while being inclined with respect to the sensor cover 23.

In contrast, in the present embodiment, the inclination angle θ of the lens holder 11 is set to fall within such a range that the maximum external diameter section 3a of the lens barrel 3 does not make contact with the lens holder 11.

Therefore, the inclination angle of the lens barrel 3 does not depend on the inclination angle θ of the lens holder 11. As a result, it is possible to realize the camera module 40 into which the lens barrel 3, that is, the image pickup lens 2, is incorporated at a small inclination angle.

Further, in the camera module 40 in accordance with the present embodiment, the sensor cover 23 covering the image pickup element 22 of the image pickup section 20 has the protrusion 26b serving as an abutting portion that abuts the image pickup element 22.

This allows the sensor cover 23 to be mounted directly on the upper surface of the image pickup element 22, thus making it possible to increase a degree of precision in attachment position of the image pickup lens 2.

Furthermore, the method for producing the camera module 40 in accordance with the present embodiment is preferably arranged such that in mounting the lens driving device 10 on the dummy sensor cover 26, a pressing force toward the dummy sensor cover 26 is applied to the lens driving device 10.

This makes it possible to prevent the lens driving device 10 from being lifted in mounting the lens driving device 10 on the dummy sensor cover 26. This eliminates an unnecessary gap between the lens driving device 10 and the dummy sensor cover 26, thus enabling precise positioning of the optical section 1.

The method for producing the camera module 40 in accordance with the present embodiment is preferably arranged such that in the step of fixing the optical section 1 to the lens driving device 10, a pressing force toward the dummy sensor cover 26 is applied to the optical section 1.

This makes it possible to prevent the optical section 1 from being lifted with respect to the dummy sensor cover 26 in mounting the optical section 1 on the lens driving device 10. This eliminates an unnecessary gap between the optical section 1 and the dummy sensor cover 26, thus enabling precise positioning of the optical section 1.

The method for producing the camera module 40 in accordance with the present embodiment is preferably arranged such that in mounting the lens driving device 10 on the image pickup section 20, a pressing force toward the image pickup section 20 is applied to the lens driving device 10.

This makes it possible to prevent the lens driving device 10 from being lifted in mounting the lens driving device 10 on the image pickup section 20. This eliminates an unnecessary gap between the lens driving device 10 and the image pickup section 20, thus enabling precise positioning of the optical section 1.

The method for producing the camera module 40 in accordance with the present embodiment is arranged such that a height adjustment device 30 serving as the jig is placed on the lens driving device 10 while the lens driving device 10 is mounted on the image pickup section 20, the step of sliding the lens barrel 3 of the optical section 1 in the optical axis direction with respect to the lens holder 11 of the lens driving device 10 is carried out while the grasping section 32a of the height adjustment device 30 grasps the lens barrel 3 of the optical section 1, a height of the optical section 1 is adjusted with use of the height adjustment device 30, and in the step of fixing the optical section 1, the optical section 1 is fixed to the lens holder 11 of the lens driving device 10, and the height adjustment device 30 is then removed.

Consequently, even if there exist a fixing tolerance in the location at which the lens driving device 10 is attached to the image pickup section 20 and/or a tolerance in thickness of the sensor cover 23, it is possible to carry out positioning of the optical section 1, with use of the height adjustment device 30 serving as the jig, by determining the height position of the optical section 1 so that the lens barrel 3 is located at such a position that the lens barrel 3 does not make contact with the sensor cover 23, without being influenced by these tolerances.

Therefore, it is possible to provide the small camera module 40 capable of preventing sliding between the lens barrel 3, which holds the image pickup lenses 2, and the sensor cover 23 of the image pickup section 20 and thus preventing generation of foreign matters due to the sliding, even in a case where the height of the initial position of the image pickup lenses 2 is not adjusted with use of a screw.

A mobile phone serving as an electronic apparatus that is, for example, a mobile phone, in accordance with the present embodiment, includes the camera module 40 in accordance with the present embodiment.

Therefore, it is possible to provide an electronic apparatus including the camera module 40 with a small size, capable of preventing sliding between the lens barrel 3, which holds the image pickup lenses 2, and the sensor cover 23 of the image pickup section 20 and thus preventing generation of foreign matters due to the sliding even in a case where the height of the initial position of the image pickup lenses 2 is not adjusted with use of a screw.

The present invention is not limited to the above embodiment and is susceptible of various changes within the scope of the present invention. For example, in the above embodiment, both of sliding planes of the lens barrel 3 and the lens holder 11 are flat planes. However, the present invention is not limited to this. For example, at least one of an external surface of the optical section 1 and an internal surface of the lens holder 11 may have threads for collection of the adhesive 4. Thus, filling a depressed part of the threads for collection of the adhesive 4 with the adhesive 4 enables improvement in adhesiveness between the lens barrel 3 and the lens holder 11. In this arrangement, the presence of the threads for collection of the adhesive 4 may cause difficulty in carrying out the sliding between the lens barrel 3 and the lens holder 11. For this reason, this arrangement is encompassed in the present invention provided that the lens barrel 3 and the lens holder 11 can slide with each other. That is, for example, even when the threads for collection of the adhesive 4 is provided, the sliding between a male screw (the lens barrel 3) and a female screw (the lens holder 11) is possible, provided that an external diameter of the male screw is smaller than an internal diameter of the female screw. In order to facilitate sliding between the lens barrel 3 and the lens holder 11, it is preferable that threads for collection of the adhesive 4 are provided on either one of the lens barrel 3 and the lens holder 11. This is because the sliding is difficult if both of the lens barrel 3 and the lens holder 11 are threaded.

The present embodiment has dealt with the image-stabilization-capable camera module 40 having both the autofocus function and the image stabilization function. However, this is not intended to limit the method for producing a camera module, a camera module, and an electronic apparatus, each in accordance with the present invention. The present invention is also applicable to a method for producing a camera module having only the image stabilization function, a camera module having only the image stabilization function, and an electronic apparatus having only the image stabilization function.

Second Embodiment

The following description will discuss another embodiment of the present invention with reference to FIG. 12. Configurations other than those explained in the present embodiment are the same as those described in First Embodiment. For the sake of convenience, members having the same functions as those shown in the drawings of First Embodiment are given the same reference signs and explanations thereof are omitted here.

The present embodiment deals with another configuration of an image-stabilization-capable camera module. As shown in FIG. 1, the camera module 40 in accordance with First Embodiment is arranged such that the sensor cover 23 of the image pickup section 20 makes contact with the image pickup element 22 at the protrusion 23a of the sensor cover 23. In contrast, a camera module 40B having the image stabilization function (hereinafter simply referred to as "camera module 40B") in accordance with the present embodiment is different from the camera module 40 in that a sensor cover 23B does not make contact with an image pickup element 22, as shown in FIG. 12.

As shown in FIG. 12, the camera module 40B in accordance with the present embodiment is arranged such that the sensor cover 23B is mounted on a substrate 21, and the sensor cover 23B does not have a protrusion corresponding to the protrusion 23a of the sensor cover 23. Consequently, the sensor cover 23B does not make contact with the image pickup element 22, so that there is a gap between the sensor cover 23B and the image pickup element 22.

Of course, a higher degree of precision in attachment position of the image pickup lenses 2 can be obtained by the camera module 40 shown in FIG. 1, in which the sensor cover 23 is directly mounted on a plane of the image pickup element 22. However, there is a case where a space for mounting the sensor cover 23 cannot be secured on the image pickup element 22. In this case, the sensor cover 23B is mounted on the substrate 21.

As described above, the camera module 40B in accordance with the present embodiment is arranged such that the sensor cover 23B which covers the image pickup element 22 of the image pickup section 20 is not in contact with the image pickup element 22.

Such a configuration can deal with a case where a space for mounting the sensor cover 23 having the protrusion 26b cannot be secured on the image pickup element 22.

A mobile phone serving as an electronic apparatus that is, for example, a mobile phone, in accordance with the present embodiment, includes the camera module 40B in accordance with the present embodiment.

Therefore, it is possible to provide an electronic apparatus having the camera module 40B of a small size, capable of preventing sliding between the lens barrel 3, which holds the image pickup lenses 2, and the sensor cover 23B of the image pickup section 20 and thus preventing generation of foreign matters due to the sliding, even in a case where the height of the initial position of the image pickup lenses 2 is not adjusted with use of a screw.

The present embodiment has dealt with the image-stabilization-capable camera module 40B having both the autofocus function and the image stabilization function. However, this is not intended to limit the method for producing a camera module, a camera module, and an electronic apparatus, each in accordance with the present invention. The present invention is also applicable to a method for producing a camera module having only the image stabilization function, a camera module having only the image stabilization function, and an electronic apparatus having only the image stabilization function.

Third Embodiment

The following description will discuss one embodiment of the present invention with reference to FIGS. 13 to 22.

A method for producing a camera module, a camera module, and an electronic apparatus, each in accordance with the present embodiment, solve the aforementioned problem of the conventional art example. That is, the present embodiment provides a method for producing a camera module, a camera module, and an electronic apparatus, each capable of reducing the area where a reference plane of a movable section makes contact with a reference plane of a fixed section, thus reducing a risk of causing the occurrence of stroke hysteresis at and near a starting position of a stroke, even in a case where the height of an initial position of an image pickup lens is not adjusted with use of a screw.

The camera module in accordance with the present embodiment is a camera module having only an autofocus function.

(Configuration of Camera Module)

Initially, with reference to FIGS. 13 and 14, the following description will discuss a configuration of the camera module in accordance with the present embodiment. FIG. 14 is a perspective view of the camera module in accordance with the present embodiment, and FIG. 13 is a cross sectional view taken along an arrow line Y-Y of the camera module shown in FIG. 14.

A camera module 80 in accordance with the present embodiment is a camera module used for an electronic apparatus such as a mobile phone equipped with a camera. The camera module 80 has a substantially rectangular solid shape as shown in FIG. 14.

The camera module 80 includes a rectangular image pickup section 70 provided at a lower part thereof, an optical section 51 contained in a box-shaped cover 67 provided above the image pickup section 70, and a lens driving device 60 which drives the optical section 51. The cover 67 has, at the center of the upper surface thereof, an opening 67a for exposing image pickup lenses 52 (mentioned later) of the optical section 51. For convenience, the following description assumes that an optical section 51 side is an upper side of the camera module 80, and that an image pickup section 70 side is a lower side of the camera module 80.

As shown in FIG. 13, the optical section 51 of the camera module 80 includes the image pickup lenses 52 and a lens barrel 53 for accommodating the image pickup lenses 52. Around the optical section 51, there is provided the lens driving device 60 for driving the optical section 51, and the lens driving device 60 includes a lens holder 61 which holds the lens barrel 53 of the optical section 51 therein with the lens barrel 53 being adhesively fixed to the lens holder 61 with an adhesive 54.

The image pickup section 70 provided below the lens driving device 60 includes: a substrate 71; an image pickup element 72, provided on the substrate 71, carrying out photoelectric conversion of light having passed through the optical section 51; and a sensor cover 73 and a glass substrate 74 each of which covers the image pickup element 72. The substrate 71, the image pickup element 72, the sensor cover 73, and the glass substrate 74 are stacked in this order in the optical axis direction.

In the lens driving device 60, the lens holder 61 to which the optical section 51 is fixed with the adhesive 54 is supported by two AF (autofocus) springs, i.e. an upper AF spring 62*a* and a lower AF spring 62*b*, so as to be movable in the optical axis direction with respect to a fixed section. AF coils 64 are fixed to a circumferential section of the lens holder 61. The fixed section includes a yoke 63, a base 69, and a cover 67, and one end of the upper AF spring 62*a* is fixed to the yoke 63, while one end of the lower-positioned AF spring 62*b* is fixed to the base 69.

The lens holder 61 has a protrusion 61*a* at the lower part thereof. The protrusion 61*a* is in abutment with the base 69 at a mechanical end on an infinite-distance side in a movable range in the optical axis direction (reference position on the image pickup element side in a movable range).

The optical section 51 is embedded in the base 69 in such a manner that the lens barrel 53 partially reaches inside the opening 69*a* of the base 69. Such a configuration is often employed in a case where it is difficult to secure a sufficiently large flange focal distance of the image pickup lenses 52 (a distance between the bottom surface of the lens barrel 53 and the top surface of the image pickup element 72) (although the drawing shows a sufficient distance between the bottom of the image pickup lens 52 and the bottom of the lens barrel 53, in many actual cases a sufficient distance therebetween cannot be secured).

In the image pickup section 70, the sensor cover 73 on which the lens driving device 60 is mounted is placed on the image pickup element 72 in such a manner as to cover the whole image pickup element 72. The sensor cover 73 has a protrusion 73*a* at a lower part thereof, and a reference plane S of an end portion of the protrusion 73*a* is in abutment with the image pickup element 72. The sensor cover 73 has an opening 73*b* at an image pickup lens 52 side of the sensor cover 73, and the opening 73*b* is covered with the glass substrate 74 having an infrared cutting function.

The image pickup element 72 is mounted on the substrate 71. Although a gap between the substrate 71 and the sensor cover 73 may be caused due to a tolerance, the substrate 71 is adhesively fixed to the sensor cover 73 with the gap filled with an adhesive 75.

In the present embodiment, the lens barrel 53 and the lens holder 61 are not threaded, and the lens barrel 53 is fixed at a predetermined position while the lens holder 61 is located at the mechanical end on the infinite-distance side. In the present embodiment, a gap of approximately 10 μm is provided between the lens barrel 53 and the sensor cover 73. A method for producing the camera module 80 in which the lens barrel 53 and the sensor cover 73 are not in abutment with each other, as described above, will be discussed later.

The camera module 80 in accordance with the present embodiment, by virtue of the configuration described above, secures a gap between the lens barrel 53 and the sensor cover 73 at the mechanical end on the infinite-distance side even though the camera module 80 is arranged to eliminate the need for the adjustment involving the use of a screw, and thus makes it possible to reduce the risk of causing the occurrence of stroke hysteresis at and near a starting position of a stroke.

(AF Function of Camera Module)

For the sake of focus adjustment, the optical section 51 of the camera module 80 having the above configuration in accordance with the present embodiment is caused to move back and forth in the optical axis direction in the following manner. A current is caused to pass through the AF coils 64 of the lens driving device 60 under a driving instruction from a control section of, for example, a mobile phone or a digital camera in which the camera module 80 is provided. Thus, the current passing through the AF coils 64 acts on a magnetic field generated from the permanent magnet 65, thus generating a thrust force to move the AF coils 64 in the optical axis direction. This causes the AF springs 62*a* and 62B and the lens holder 61 to move the optical section 51 back and forth in the optical axis direction. In this manner, the optical section 51 can be controlled to perform autofocus (AF).

Therefore, the AF coils 64, the permanent magnet 65, the AF springs 62*a* and 62*b*, and the lens holder 61 serve as autofocus means of the present invention.

(Attachment Position of the Optical Section to the Lens Holder)

The following description will discuss a position at which the optical section 51 including the image pickup lenses 52 and the lens barrel 53 is attached to the lens holder 61 of the lens driving device 60.

It is desirable that the image pickup lenses 52 of the optical section 51 are provided, in the lens holder 61, at such a distance away from the image pickup element 72 that a focal point of the image pickup lenses 52 is located at the mechanical end on the infinite-distance side.

However, an error remains in a case where positioning of the image pickup lenses 52 is carried out with use of a mechanical stopper without focus adjustment. This is because there exist (i) the tolerance in the location at which the image pickup lenses 52 are attached to the lens barrel 53, and (ii) the tolerance in the thickness of the sensor cover 73, resulting in the unevenness of the members. Consequently, it is necessary to find a focal point within a stroke of the lens driving device 60 even when there is such an error. Accordingly, it is necessary to attach the image pickup lenses 52 to the lens holder 61 at a position which is slightly shifted from a designed center location of the focal point to the image pickup element 72. Such a slight shift is referred to as "over infinity". As the over infinity is set to be large, the stroke of the lens driving device 60 becomes large accordingly. The over infinity therefore needs to be kept to a minimum.

According to cumulative total of the variety of tolerances above, the amount of an appropriate over infinity is approximately 25 μm. However, since this value is susceptible to the tolerances for manufacturing and assembling of the members, it is desirable that the over infinity is set to a realistic minimum one. In a structure of the camera module 80 in accordance with the present embodiment, a reference plane (on the bottom part) of the sensor cover 73 is caused to directly abut the image pickup element 72. Furthermore, using the sensor cover 73, in which thickness accuracy is improved, highly precise positioning of the lens barrel 53 is carried out with respect to the upper plane of the sensor cover 73 (in other words, with respect to the lower plane of the lens driving device 60 since the lower reference plane of the lens driving device 60 is mounted on the upper plane of the sensor cover 73). Such a structure allows the camera module 48 to achieve the over infinity of approximately 25 µm.

Assume that in FIG. 13, the lens barrel 53 is provided at a position which is shifted closer by 25 µm to the image pickup element 72 from a location where an object at infinity is to be focused, while a gap exists between the sensor cover 73 and the lens barrel 3. A description will be provided below based on the assumption.

(Method for Producing Camera Module)

Another main feature of the camera module 80 in accordance with the present embodiment lies in that the camera module 80 eliminates the need for adjusting the height of the lens barrel 53 with use of a screw, while maintaining a gap between the lens barrel 53 and the sensor cover 73.

The conventional technique of adjusting the height of an initial position of a lens barrel with use of a screw can easily maintain a gap between the lens barrel 53 and the sensor cover 73. However, in order to determine the height of the lens barrel without adjusting the height of the initial position, it is necessary to determine the position by causing the lens barrel to abut a member of some kind. Accordingly, the conventional technique of causing the lens barrel 53 to abut the sensor cover 73 inevitably results in contact between the lens barrel 53 and the sensor cover 73.

In contrast, the camera module 80 in accordance with the present embodiment is also distinguished by a production method which determines an initial position of the lens barrel 53 with high precision without causing the lens barrel 53 to abut a member such as the sensor cover 73.

With reference to FIGS. 15 to 21, the following description will discuss a production method which (i) determines an initial position of the lens barrel 53 with high precision and (ii) fixes the lens barrel 53, without use of a screw for focus adjustment at an initial position and without height adjustment. FIGS. 15 to 21 are views showing production steps of the camera module 80.

Initially, with reference to FIG. 15, the following description will discuss the steps of preparing the optical section 51, the lens driving device 60, and a dummy sensor cover 76 and then mounting the lens driving device 60 on the dummy sensor cover 76.

Specifically, as shown in FIG. 15, for the camera module 80 in accordance with the present embodiment, the dummy sensor cover 76 serving as a jig is prepared for use in the production of the camera module 80. The dummy sensor cover 76 has (i) a flat plane 76a on which the lens driving device 60 is to be mounted and (ii) a protrusion 76b protruding from the flat plane 76a. A difference D in height between the protrusion 76b and the flat plane 76a may be set as a gap for preventing the lens barrel 53 from making contact with the sensor cover 73 at a mechanical end at an infinite-distance side. Normally, if the difference D is not less than approximately 5 µm to 10 µm, the difference D can function as a gap. However, although the difference D of that value is sufficient if adhesive matters which may adhere are thin, the difference D may be made a little larger if a possibility that adhesive matters in bulk form adhere is taken into consideration. A designed value of the difference D may be 5 µm or 10 µm, but it is desirable to prepare the dummy sensor cover 26 with the difference D as close to the designed value as possible. In the description with reference to FIG. 13, the designed value of the difference D is approximately 10 µm.

With reference to FIG. 16, the following description will discuss a state where the lens driving device 60 is mounted on the dummy sensor cover 76.

As described above, the lens driving device 60 is mounted on the flat plane 76a of the dummy sensor cover 76, so that the protrusion 76b reaches inside the opening 69a of the base 69 in the lens driving device 60.

During a period in which the lens driving device 60 is mounted on the flat plane 76a of the dummy sensor cover 76, it is desirable to apply a pressing force on the lens driving device 60 in a direction indicated by a hatched arrow A in FIG. 16. The reason is as follows. As described above, since it is necessary to determine the position of the lens barrel 53 with high precision with respect to the bottom plane of the lens driving device 60, the lens driving device 60 being lifted with respect to the dummy sensor cover 76 would result in deterioration in accuracy. Accordingly, it is preferable to apply the pressing force as above.

With reference to FIG. 17, the following description will discuss a state where the lens barrel 53 (optical section 51) is mounted on the lens driving device 60 in such a manner as to abut the protrusion 76b of the dummy sensor cover 76.

As shown in FIG. 17, the shape of the lens barrel 53 is designed such that while the bottom plane of the lens barrel 53 is in abutment with the protrusion 76b of the dummy sensor cover 76, the image pickup lenses 52 are located at a position shifted closer by 25 µm to the image pickup element 72 from a focal point located on the infinite-distance side. Of course, an actual shape of the lens barrel 53 exhibits a tolerance with respect to the designed value. During a period in which the bottom plane of the lens barrel 53 is in abutment with the protrusion 76b of the dummy sensor cover 76, it is desirable to apply a pressing force in a direction indicated by a hatched arrow B in FIG. 17. It is desirable that the aforementioned pressing force applied on the lens driving device 60, which force is indicated by the hatched arrow A in FIG. 16, is continuously applied. Since reference positions of the lens barrel 53 and the lens driving device 60 are set by a mechanical stopper, lifting of the lens barrel 53 and the lens driving device 60 would result in errors in their reference positions. With the pressing force is applied as above (in such a state that lifting of the lens barrel 53 is prevented), the lens barrel 53 is adhesively fixed to the lens holder 61 with the adhesive 54.

With reference to FIG. 18, the following description will discuss a state where the dummy sensor cover 76 is removed from the lens driving device 60.

As shown in FIG. 18, the dummy sensor cover 76 is a jig for positioning the lens barrel 53, and becomes unnecessary after the lens barrel 53 has been adhesively fixed to the lens holder 61.

With reference to FIG. 19, the following description will discuss the step of preparing the image pickup section 70 and replacing the dummy sensor cover 76 with the image pickup section 70.

As shown in FIG. 19, instead of the dummy sensor cover 76, the image pickup section 70 including the image pickup element 72 needs to be connected to the lens driving device 60 to which the optical section 51 has been already fixed.

With reference to FIG. 20, the following description will discuss the step of mounting, on the image pickup section 70, the lens driving device 60 including the optical section 51 therein.

As shown in FIG. 20, the lens driving device 60 including the optical section 51 therein is mounted on the upper surface of the sensor cover 73 of the image pickup section 70, and then adhesively fixed to the sensor cover 73 with an adhesive (not shown). It is desirable to apply a pressing force in a direction indicated by a hatched arrow C in FIG. 20 until the adhesive with which the lens driving device 60 is adhered to the sensor cover 73 is cured to have a required strength. The application of such a pressing force is, for the same reason as above, intended to prevent the lens driving device 60 from being lifted with respect to the upper surface of the sensor cover 73.

The method as described above allows production of the camera module 80 in which the image pickup lenses 52 are positioned with high precision and in which a gap is provided between the lens barrel 53 and the sensor cover 73.

(Another Method for Producing Camera Module)

With reference to FIG. 21, the following description will discuss another production method different from the aforementioned method. FIG. 21 is a cross sectional view for explaining another method for producing the camera module 80 in accordance with the present embodiment.

In a case where the camera module 80 is produced by another method, initially, a height adjustment device 30 is provided on a top plane of the lens driving device 60, as shown in FIG. 21. That is, the height adjustment device 30 has an identical structure and an identical function with those of the height adjustment device 3 explained in First Embodiment.

Description of the height adjustment device 30 is reiterated below. As shown in FIG. 21, the height adjustment device 30 includes a seat 31 fixed to the lens driving device 60, an arm section 32 for holding the lens barrel 53', a support spring 33 for supporting the arm section 32 in such a manner that the arm section 32 is movable in an optical axis direction with respect to the seat 31, and the like. In this case, the lens barrel 53' is different from the lens barrel 53 in that it has risers which allow the arm section 32 of the height adjustment device 30 to grasp the lens barrel 53'.

Means for driving the arm section 32 is not shown in particular. The arm section 32 may be driven by a voice coil motor as in the case of the lens driving device 60, or may be driven by driving means such as a piezoelectric element. Furthermore, a grasping section 32a provided at an end of a lower part of the arm section 32 may be made openable/closable, so that the grasping section 32a can firmly grasp the lens barrel 53' by a pressurizing spring (not shown). As described above, the arm section 32 is moved up and down by the driving means (not shown) while grasping the lens barrel 53', and the lens barrel 53' is then adhesively fixed to the lens holder 61 with the adhesive 54 at a position where a focus has been detected.

Thus, it is important to provide a gap between the lens barrel 53' and the sensor cover 73, with the lens barrel 53' being adhesively fixed to the lens holder 61. In the present embodiment, since the height of the lens barrel 53' is adjusted, an excess stroke corresponding to the over infinity is not required. In view of the stroke of the lens driving device 60, it is most desirable to position the lens barrel 53' with over infinity which can cover an adjustment error (about several micrometers) that may occur in a slight amount. After the lens barrel 53' has been adhesively fixed, the arm section 32 stops holding the lens barrel 53' and releases the lens barrel 53', and the height adjustment device 30 is removed from the lens driving device 60.

With the above adjustment method, it is possible to produce the camera module 80 (i) which eliminates the need for carrying out screwing for focus adjustment at an initial position, (ii) which has the image pickup lens 52 precisely positioned therein, and (iii) which has a gap between the lens barrel 53' and the sensor cover 73.

The present invention is not limited to the above embodiment, and is susceptible of various changes within the scope of the present invention. For example, in the above embodiment, both of sliding planes of the lens barrel 53 and the lens holder 61 are flat planes. However, the present invention is not limited to this. For example, at least one of an external surface of the optical section 51 and an internal surface of the lens holder 61 may have threads for collection of the adhesive 54. Thus, filling a depressed part of the threads for collection of the adhesive 54 with the adhesive 54 enables improvement in adhesiveness between the lens barrel 53 and the lens holder 61. In this arrangement, the presence of the threads for collection of the adhesive 54 may cause difficulty in carrying out the sliding between the lens barrel 53 and the lens holder 61. For this reason, this arrangement is encompassed in the present invention provided that the lens barrel 53 and the lens holder 61 can slide with each other. That is, for example, even when the threads for collection of the adhesive 54 is provided, the sliding between a male screw (the lens barrel 53) and a female screw (the lens holder 61) is possible, provided that an external diameter of the male screw is smaller than an internal diameter of the female screw. In order to facilitate sliding between the lens barrel 53 and the lens holder 61, it is preferable that threads for collection of the adhesive 54 are provided on either one of the lens barrel 53 and the lens holder 61. This is because the sliding is difficult if both of the lens barrel 53 and the lens holder 61 are threaded.

As described above, the camera module 80 and the method for producing the camera module 80, each in accordance with the present embodiment, have autofocus means.

Consequently, it is unnecessary to adjust the height of the initial position of the image pickup lens 52 with use of a screw, and it is possible to simplify or omit a step of adjusting a focus at the initial position. Furthermore, even when the present invention is applied to the camera module 80 having an autofocus function, it is possible to prevent sliding between the lens barrel 53 and the sensor cover 73 and to thus prevent generation of foreign matters or the like event due to sliding. Furthermore, since it is unnecessary to adjust the height of the initial position of the image pickup lenses 52 with use of a screw, the present invention is applicable to a small camera module having an autofocus function.

Effects Yielded by Other Configurations are the Same as Those Explained in First Embodiment.

The present embodiment has dealt with the autofocus-capable camera module 80 having only the autofocus function. However, this is not intended to limit the method for producing a camera module, a camera module, and an electronic apparatus, each in accordance with the present invention. The present invention is also applicable to a general method for producing a camera module, a general camera module, and a general electronic apparatus, each not having the autofocus function.

An example of the camera module having such a configuration includes a camera module which has a driving mechanism for switching between an infinite focus and a macro focus, but which does not have an autofocus function.

Fourth Embodiment

The following discussion will discuss another embodiment of the present invention with reference to FIG. 22. Configurations other than those described in the present embodiment are the same as those described in Second Embodiment. For the sake of convenience, members having the same functions as those described with reference to the drawings of Second Embodiment are given the same reference signs and explanations thereof are omitted.

The present embodiment deals with another configuration of a camera module. As shown in FIG. 13, the camera module 80 in accordance with Second Embodiment is arranged such that a lower reference plane of the sensor cover 73 makes contact with the image pickup element 72. In contrast, a camera module 80B in accordance with the present embodiment is different from the camera module 80 in that a sensor cover 73B does not make contact with an image pickup element 72, as shown in FIG. 21.

As shown in FIG. 22, the camera module 80B in accordance with the present embodiment is arranged such that the sensor cover 73B is mounted on a substrate 71. Consequently, the sensor cover 73B does not make contact with the image pickup element 72, so that there is a gap between the sensor cover 73B and the image pickup element 72.

Of course, a higher degree of precision in attachment position of the image pickup lens 52 can be obtained by the camera module 80 shown in FIG. 13, in which the sensor cover 73 is directly mounted on a plane of the image pickup element 72. However, there is a case where a space for mounting the sensor cover 73 cannot be secured on the image pickup element 72. In this case, the sensor cover 73B is mounted on the substrate 71.

As described above, the camera module 80B in accordance with the present embodiment is arranged such that the sensor cover 73B which covers the image pickup element 72 of the image pickup section 70 is not in contact with the image pickup element 72.

This configuration can deal with cases such as a case where there cannot be a space for forming a reference plane on the lower side of the sensor cover 73 and a case where the image pickup element 72 does not exist at a position of the formed reference plane.

A mobile phone serving as an electronic apparatus that is, for example, a mobile phone, in accordance with the present embodiment, includes the camera module 80B in accordance with the present embodiment.

Consequently, even in a case where the height of the initial position of the image pickup lenses 52 is not adjusted with use of a screw, a gap is secured between (i) the lens barrel 53 holding the image pickup lenses 52 and (ii) the sensor cover 73B of the image pickup section 70 at the mechanical end on the infinite-distance side. Even when adhesive matters are deposited, it is possible to reduce the risk of causing stroke hysteresis at and near a starting position of a stroke.

The present embodiment has dealt with the camera module 80B having only the autofocus function. However, this is not intended to limit the method for producing a camera module, a camera module, and an electronic apparatus, each in accordance with the present invention. The present invention is also applicable to a general method for producing a camera module, a general camera module, and a general electronic apparatus, each not having the autofocus function. Examples of the camera module with such a configuration include a camera module which has a driving mechanism for switching between an infinite focus and a macro focus but which does not have the autofocus function.

The present invention is not limited to the aforementioned embodiments and is susceptible of various changes within the scope of the accompanying claims. That is, embodiments obtained by suitable combinations of technical means disclosed in different embodiments are also encompassed within the technical scope of the present invention.

As described above, the camera module of the present invention may be arranged so as to further include autofocus means.

The method of the present invention may be arranged such that the camera module further includes autofocus means.

Consequently, it is unnecessary to adjust a height of an initial position of the image pickup lens with use of a screw, and it is possible to simplify or omit a step of adjusting a focus at the initial position. Furthermore, even in a case where the present invention is applied to a camera module having an autofocus function, it is possible to prevent sliding between the lens barrel and the sensor cover and to thus prevent generation of foreign matters or the like event due to the sliding. Furthermore, since it is unnecessary to adjust the height of the initial position of the image pickup lens with use of a screw, the present invention is applicable to a small camera module having an autofocus function.

The camera module of the present invention may be arranged so as to further include image stabilization means, the lens driving device driving the optical section and the lens holder integrally with each other in the optical axis direction and in a direction orthogonal to the optical axis.

The method of the present invention may be arranged such that the camera module further includes image stabilization means, and the lens driving device of the camera module drives the optical section and the lens holder integrally with each other in the optical axis direction and in a direction orthogonal to an optical axis.

Consequently, it is unnecessary to adjust a height of an initial position of the image pickup lens with use of a screw, and it is possible to simplify or omit a step of adjusting a focus at the initial position. Furthermore, even in a case where the present invention is applied to a camera module having at least an image stabilization function, it is possible to prevent sliding between the lens barrel and the sensor cover and to thus prevent generation of foreign matters or the like event due to the sliding. Furthermore, since it is unnecessary to adjust the height of the initial position of the image pickup lens with use of a screw, the present invention is applicable to a small camera module having an image stabilization function.

The camera module of the present invention is preferably arranged such that a height of an initial position of the optical section is determined by using a jig.

The camera module of the present invention may be arranged such that the jig is constituted by a flat plate having a protrusion, and the height of the initial position of the optical section is determined with use of the jig in such a manner that a top plane of the protrusion of the jig is caused to abut a bottom plane of the optical section which bottom plane is located on an image pickup element side.

The method of the present invention may be arranged such that the step of sliding the lens barrel of the optical section in the optical axis direction with respect to the lens holder of the lens driving device is carried out after the optical section is inserted into the lens driving device while the lens driving device is mounted on a dummy sensor cover serving as the jig, the step of fixing the optical section to the lens driving device is carried out while a part of the optical section is caused to abut a reference plane of the dummy sensor cover, and the dummy sensor cover is replaced with the image pickup section and the lens driving device is then fixed to the sensor cover of the image pickup section.

Thus, a vertical position of the image pickup lens is determined by causing the optical section to abut the jig. This eliminates the need for the step of carrying out screwing for the focus adjustment at the initial position and also eliminates the need for the focus adjustment itself.

The camera module of the present invention is preferably arranged such that the jig has a grasping section grasping the lens barrel of the optical section in such a manner that the lens barrel is slidable, with respect to the lens holder, in the optical axis direction, and the height of the initial position of the optical section is determined with use of the jig in such a manner that the grasping section of the jig grasps the lens barrel of the optical section so as to displace the optical section in the optical axis direction.

Thus, the positioning can be made merely by causing the jig grasping the lens barrel to move upward and downward in the optical axis direction. Consequently, it is possible to eliminate the need for the step of carrying out screwing for the focus adjustment at the initial position, and to simplify the focus adjustment at the initial position.

The camera module of the present invention is preferably arranged such that the lens driving device includes, at a sensor cover side, a base supporting the lens holder so that the lens holder freely swings, the base having an opening to which the lens barrel is fit loosely, and a gap between the opening of the base and the lens barrel is so set that the base does not make contact with the lens barrel even when the lens holder is displaced to a maximum extent toward the lens barrel.

Consequently, even in a case where the camera module undergoes a drop impact or the like event, for example, a part that defines a movable range of the lens driving device (a part serving as a stopper) makes contact with the base firstly. This avoids the lens barrel from directly colliding with the base, thus making it possible to protect the lens barrel from damage caused by the drop impact.

The camera module of the present invention is preferably arranged such that the lens barrel having been positioned is fixed to the lens holder with an adhesive, and a position where the adhesive is applied to the lens holder is lower than a top plane of the lens holder, the top plane being opposite to a bottom plane of the lens holder which bottom plane is located on the sensor cover side.

This allows the inner wall of the lens holder to prevent the adhesive for fixing the lens barrel from flowing out over the top plane of the lens holder.

The camera module of the present invention is preferably arranged such that a module cover having, at a center thereof, an opening for exposing the lens barrel is so provided as to cover the lens holder and the lens barrel, and the lens holder is so placed as not to make contact with the module cover even when the lens barrel moves to a maximum extent. The phrase "movement (moves) to a maximum extent" herein includes an event where the lens barrel protrudes abnormally due to a drop impact or the like.

With this arrangement, even in a case where the lens holder is small in thickness and small in strength, the top plane of the lens holder which plane is located on the module cover side does not make contact with the module cover. This allows preventing the lens holder from damage caused by a drop impact or the like.

The camera module of the present invention is preferably arranged such that the jig is made of only a non-magnetic material.

If the jig is made of a magnetic material, the lens holder, which includes the permanent magnet, would be likely to be displaced due to magnetism of the jig when the lens barrel is to be fixed to the lens holder. In contrast, since the jig is made up of only a non-magnetic material, the lens holder is not caused to be excessively displaced when the lens barrel is to be fixed to the lens holder. Accordingly, it is possible to fix the lens barrel to the lens holder with high precision.

The camera module of the present invention is preferably arranged such that an inclination angle θ of the lens holder with respect to a surface of the sensor cover is set to meet a relation $$\theta \leq \tan^{-1}(H/D_E) - \cos^{-1}(D_I/\sqrt{(D_E^2 + H^2)})$$

wherein $D_E$ represents an external diameter of a maximum external diameter portion of the lens barrel, H represents a thickness of the maximum external diameter portion of the lens barrel, and $D_I$ represents a cylindrical internal diameter of the lens holder. The inclination angle θ of the lens holder with respect to the surface of the sensor cover is an inclination angle θ of the lens holder with respect to a reference plane of the lens driving device.

In the present invention, in a case where the lens barrel is installed in the lens driving device, the jig is used for adjustment of a distance between the lens barrel and the sensor cover. In this case, the lens barrel is inserted into a cylindrical hole of the lens holder while being slid in the cylindrical hole, and the lens barrel is positioned and fixed with the lens barrel mounted on the jig. Accordingly, the inclination of the lens barrel depends on a degree of precision with which the lens barrel 3 is mounted on the mounting plane of the jig. However, in a case where the cylindrical hole of the lens holder is inclined more than necessary, there is a possibility that the lens barrel is fixed in conformity with the cylindrical hole of the lens holder and is, in turn, mounted on the plane of the jig with poor precision.

Therefore, inclination of the lens holder more than necessary with respect to a surface of the sensor cover 23 which surface is a reference plane of the sensor cover 23 on which plane the lens driving device 10 is to be mounted causes inclination of the cylindrical hole of the lens holder with respect to the jig when the lens driving device is mounted on the jig in order to install the lens barrel. This may cause the lens barrel to be attached to the sensor cover while being inclined with respect to the sensor cover.

In contrast, in the present embodiment, the inclination angle θ of the lens holder is set to fall within such a range that the maximum external diameter section of the lens barrel does not make contact with the lens holder.

Therefore, the inclination angle of the lens barrel does not depend on the inclination angle θ of the lens holder. As a result, it is possible to realize the camera module on which the lens barrel, that is, the image pickup lens, is incorporated at a small inclination angle.

The camera module of the present invention may be arranged such that the sensor cover covering the image pickup element of the image pickup section has an abutting section that abuts the image pickup element.

This allows the sensor cover to be mounted directly on the upper surface of the image pickup element, thus making it possible to increase a degree of precision in attachment position of the image pickup lens.

The camera module of the present invention is preferably arranged such that the sensor cover covering the image pickup element of the image pickup section does not make contact with the image pickup element.

Such a configuration can deal with a case where a space for mounting the sensor cover having the protrusion cannot be secured on the image pickup element.

The method of the present invention is preferably arranged such that in mounting the lens driving device on the dummy sensor cover, a pressing force toward the dummy sensor cover is applied to the lens driving device.

This makes it possible to prevent the lens driving device from being lifted in mounting the lens driving device on the dummy sensor cover. This eliminates an unnecessary gap between the lens driving device and the dummy sensor cover, thus enabling precise positioning of the optical section.

The method of the present invention is preferably arranged such that in the step of fixing the optical section to the lens driving device, a pressing force toward the dummy sensor cover is applied to the optical section.

This makes it possible to prevent the optical section from being lifted with respect to the dummy sensor cover in mounting the optical section on the lens driving device. This eliminates an unnecessary gap between the optical section and the dummy sensor cover, thus enabling precise positioning of the optical section.

The method of the present invention is preferably arranged such that in mounting the lens driving device on the image pickup section, a pressing force is applied toward the image pickup section is applied to the lens driving device.

This makes it possible to prevent the lens driving device from being lifted in mounting the lens driving device on the image pickup section. This eliminates an unnecessary gap between the lens driving device and the image pickup section, thus enabling precise positioning of the optical section.

The method of the present invention may be arranged such that a height adjustment device serving as the jig is placed on the lens driving device while the lens driving device is mounted on the image pickup section, the step of sliding the lens barrel of the optical section in the optical axis direction with respect to the lens holder of the lens driving device is carried out while a grasping section of the height adjustment device grasps the lens barrel of the optical section, a height of the optical section is adjusted with use of the height adjustment device, and in the step of fixing the optical section, the optical section is fixed to the lens holder of the lens driving device, and the height adjustment device is then removed.

Consequently, even if there exists a fixing tolerance in the location at which the lens driving device is attached to the image pickup section and/or a tolerance in thickness of the sensor cover, it is possible to carry out positioning of the optical section, with use of the height adjustment device serving as the jig, by determining the height of the position of the optical section so that the lens barrel is located at such a position that the lens barrel does not make contact with the sensor cover, without being influenced by these tolerances.

Therefore, it is possible to provide a small camera module capable of preventing sliding between the lens barrel, which holds the image pickup lenses, and the sensor cover of the image pickup section and thus preventing generation of foreign matters due to the sliding, even in a case where the height of an initial position of the image pickup lenses is not adjusted with use of a screw.

INDUSTRIAL APPLICABILITY

The present invention is suitably applicable especially to a method for producing a camera module and a camera module, each mounted in various electronic apparatuses typified by communication devices such as mobile terminals. Furthermore, the present invention is applicable to a camera module having an autofocus function and/or an image stabilization function, or a general camera module not having these functions.

REFERENCE SIGNS LIST

1 Optical section
2 Image pickup lens
3 Lens barrel
3a Maximum external diameter portion
4 Adhesive
10 Lens driving device
11 Lens holder (image stabilization means, autofocus means)
11a Protrusion
11b Top plane of lens holder
12a AF spring (image stabilization means, autofocus means)
12b AF spring (image stabilization means, autofocus means)
13 Intermediate member (image stabilization means)
14 AF coil (autofocus means)
15 Permanent magnet (image stabilization means, autofocus means)
16 Elastic wire (image stabilization means)
17 Module cover
17a Opening
18 OIS coil (image stabilization means)
19 Base
19a Opening
20 Image pickup section
21 Substrate
22 Image pickup element
23 Sensor cover
23B Sensor cover
23a Protrusion
23b Opening
24 Glass substrate
25 Adhesive
26 Dummy sensor cover (jig)
26a Flat plane
26b Protrusion (abutting section)
30 Height adjustment device
31 Seat
32 Arm section
32a Grasping section
33 Support spring
40 Camera module having image stabilization function (camera module)
40B Camera module having image stabilization function (camera module)
51 Optical section
52 Image pickup lens
53 Lens barrel
53' Lens barrel
54 Adhesive
60 Lens driving device
61 Lens holder (autofocus means)
61a Protrusion
62a AF spring (autofocus means)
62b AF spring (autofocus means)
63 Yoke
64 AF coil (autofocus means)
65 Permanent magnet (autofocus means)
67 Cover
69 Base
69a Opening
70 Image pickup section
71 Substrate
72 Image pickup element
73 Sensor cover
73B Sensor cover
73a Protrusion
73b Opening
74 Glass substrate
75 Adhesive
76 Dummy sensor cover 76a Flat plane
76b Protrusion
80 Camera module
80B Camera module

The invention claimed is:

1. A camera module, comprising:
an optical section including an image pickup lens and a lens barrel holding the image pickup lens; and
a lens driving device which includes a lens holder holding the optical section and which drives the optical section and the lens holder integrally with each other in at least an optical axis direction, wherein
the optical section and the lens driving device are provided on an upper side of a sensor cover covering an image pickup element of an image pickup section,
the lens holder and the lens barrel are not provided with a thread groove,
the lens barrel is fixed to the lens holder,
a first gap section is provided between a bottom plane of the lens barrel and a top plane of the sensor cover in an optical axis direction,
a second gap section is provided between a bottom plane of the image pickup lens and the top plane of the sensor cover, without any support between the bottom plane of the image pickup lens and the top plane of the sensor cover,
a bottom plane of the lens holder and the top plane of the sensor cover face each other and are separated by a third gap section in the optical axis direction, and
the first gap section between the bottom plane of the lens barrel and the top plane of the sensor cover in the optical axis direction is shorter in length than the third gap section between the bottom plane of the lens holder and the top plane of the sensor cover in the optical axis direction, and
before being fixed to the lens holder, the lens barrel is slidable in the optical axis direction with respect to the lens holder.

2. The camera module as set forth in claim 1, further comprising an autofocus portion.

3. The camera module as set forth in claim 1, further comprising an image stabilization portion,
the lens driving device driving the optical section and the lens holder integrally with each other in the optical axis direction and in a direction orthogonal to an optical axis.

4. The camera module as set forth in claim 1, wherein
the lens driving device includes, on a sensor cover side, a base supporting the lens holder so that the lens holder freely swings, the base including an opening to which the lens barrel is fit loosely, and
a gap distance between the opening of the base and the lens barrel is so set that the base does not make contact with the lens barrel even when the lens holder is displaced to a maximum extent toward the lens barrel.

5. The camera module as set forth in claim 1, wherein the lens barrel having been positioned is fixed to the lens holder with an adhesive.

6. The camera module as set forth in claim 5, wherein
a module cover including, at a center thereof, an opening which exposes the lens barrel is so provided as to cover the lens holder and the lens barrel, and
the lens holder is so placed as not to make contact with the module cover even when the lens barrel moves to a maximum extent.

7. A camera module, comprising:
an optical section including an image pickup lens and a lens barrel holding the image pickup lens; and
a lens driving device which includes a lens holder holding the optical section and which drives the optical section and the lens holder integrally with each other in at least an optical axis direction;
the optical section and the lens driving device being provided on an upper side of a sensor cover covering an image pickup element of an image pickup section;
the lens barrel being positioned at such a location that the lens barrel does not make contact with the sensor cover, so that the lens barrel is fixed to the lens holder at the location;
before being fixed to the lens holder, the lens barrel being slidable in the optical axis direction with respect to the lens holder;
a height of an initial position of the optical section being determined with use of a jig; and
an inclination angle θ of the lens holder with respect to a surface of the sensor cover being set to meet a relation $$\theta \leq \tan^{-1}(H/D_E) - \cos^{-1}(D_I/\sqrt{(D_E^2 + H^2)})$$

wherein $D_E$ represents an external diameter of a maximum external diameter portion of the lens barrel, H represents a thickness of the maximum external diameter portion of the lens barrel, and $D_I$ represents a cylindrical internal diameter of the lens holder.

8. The camera module as set forth in claim 1, wherein
the sensor cover covering the image pickup element of the image pickup section includes an abutting section that abuts the image pickup element.

9. The camera module as set forth in claim 1, wherein
the sensor cover covering the image pickup element of the image pickup section does not make contact with the image pickup element.

10. An electronic apparatus, comprising a camera module as set forth in claim 1.

11. The camera module as set forth in claim 5, wherein
a position where the adhesive is applied to the lens holder is lower than a top plane of the lens holder, the top plane being opposite to a bottom plane of the lens holder which bottom plane is located on the sensor cover side.

* * * * *